(12) United States Patent
Godet et al.

(10) Patent No.: US 12,131,309 B2
(45) Date of Patent: *Oct. 29, 2024

(54) SYSTEMS AND METHODS FOR COMMUNICATING TRANSACTION DATA BETWEEN MOBILE DEVICES

(71) Applicant: Visa International Service Association, San Francisco, CA (US)

(72) Inventors: Jacques-Antoine Godet, London (GB); Onkar Singh Bahia, Essex (GB)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,267

(22) Filed: Oct. 30, 2023

(65) Prior Publication Data
US 2024/0062186 A1 Feb. 22, 2024

Related U.S. Application Data

(63) Continuation of application No. 17/625,411, filed as application No. PCT/US2019/041164 on Jul. 10, 2019.

(51) Int. Cl.
*G06Q 20/32* (2012.01)
*G06Q 20/20* (2012.01)
(Continued)

(52) U.S. Cl.
CPC ......... *G06Q 20/3255* (2013.01); *G06Q 20/20* (2013.01); *G06Q 20/401* (2013.01); *G06Q 20/42* (2013.01)

(58) Field of Classification Search
CPC .. G06Q 20/3255; G06Q 20/20; G06Q 20/401; G06Q 20/42; G06Q 20/405; G06Q 20/32
See application file for complete search history.

(56) References Cited

U.S. PATENT DOCUMENTS

| 8,369,828 B2* | 2/2013 | Hamzeh | G06Q 20/10 |
| | | | 379/114.03 |
| 10,417,638 B2* | 9/2019 | Pitz | G06Q 20/4014 |

(Continued)

OTHER PUBLICATIONS

Quirk, "Apple Patent Shows System Designed to Let People Pay Their Friends From Inside iOS Apps", Consumerist, Dec. 31, 2015, 5 pages.

(Continued)

*Primary Examiner* — Michael Jared Walker
(74) *Attorney, Agent, or Firm* — The Webb Law Firm

(57) ABSTRACT

Provided is a computer-implemented method for communicating transaction data between mobile devices, including: registering account data associated with a merchant account corresponding to short message service (SMS) device data associated with a point-of-sale (POS) device, and account data associated with a user account as corresponding to SMS device data associated with a user device; receiving, via an SMS communication connection, transaction data associated with a transaction from the POS device, verifying the POS device and the user device are registered; in response to determining that an account balance of the user account is greater than the transaction authorization limit, transmitting a first confirmation message associated with the transaction, via an SMS communication connection, to the user device to confirm the transaction; and in response to receiving a first confirmation response associated with the transaction, via an SMS communication connection, processing the transaction data.

20 Claims, 9 Drawing Sheets

(51) Int. Cl.
*G06Q 20/40* (2012.01)
*G06Q 20/42* (2012.01)

(56) References Cited

U.S. PATENT DOCUMENTS

| | | | | |
|---|---|---|---|---|
| 10,453,063 | B2* | 10/2019 | Seshadri | G06Q 20/4014 |
| 2010/0082467 | A1* | 4/2010 | Carlson | G06Q 20/24 |
| | | | | 379/114.03 |
| 2010/0125737 | A1* | 5/2010 | Kang | G06Q 40/00 |
| | | | | 713/176 |
| 2011/0251910 | A1* | 10/2011 | Dimmick | G06Q 20/12 |
| | | | | 705/17 |
| 2012/0066120 | A1* | 3/2012 | Ringewald | G06Q 20/3223 |
| | | | | 705/40 |
| 2012/0173348 | A1* | 7/2012 | Yoo | G07F 9/001 |
| | | | | 705/16 |
| 2012/0282893 | A1* | 11/2012 | Kim | G06Q 20/385 |
| | | | | 455/406 |
| 2012/0295580 | A1* | 11/2012 | Corner | G06Q 20/385 |
| | | | | 455/410 |
| 2014/0067572 | A1* | 3/2014 | Fernandes | G06Q 20/3227 |
| | | | | 705/44 |
| 2014/0258009 | A1* | 9/2014 | Alshobaki | G06Q 20/4012 |
| | | | | 705/18 |
| 2016/0104155 | A1* | 4/2016 | Mcgaugh | G06Q 20/401 |
| | | | | 705/65 |
| 2016/0335637 | A1* | 11/2016 | Deshpande | H04W 4/14 |
| 2017/0076274 | A1* | 3/2017 | Royyuru | G06Q 20/18 |
| 2019/0354974 | A1* | 11/2019 | Carvalho | G06Q 20/405 |
| 2020/0019939 | A1* | 1/2020 | Wolf | G06Q 20/4097 |
| 2020/0065820 | A1* | 2/2020 | Scholl | G06Q 20/3823 |
| 2020/0151687 | A1* | 5/2020 | Bhasin | G06Q 20/102 |
| 2020/0320564 | A1* | 10/2020 | Ramesh | G06Q 20/387 |

OTHER PUBLICATIONS

Rai et al., "M-Wallet: An SMS based payment system", International Journal of Engineering Research and Applications National Conference on Emerging Trends in Engineering & Technology, Mar. 2012, pp. 258-263.

* cited by examiner

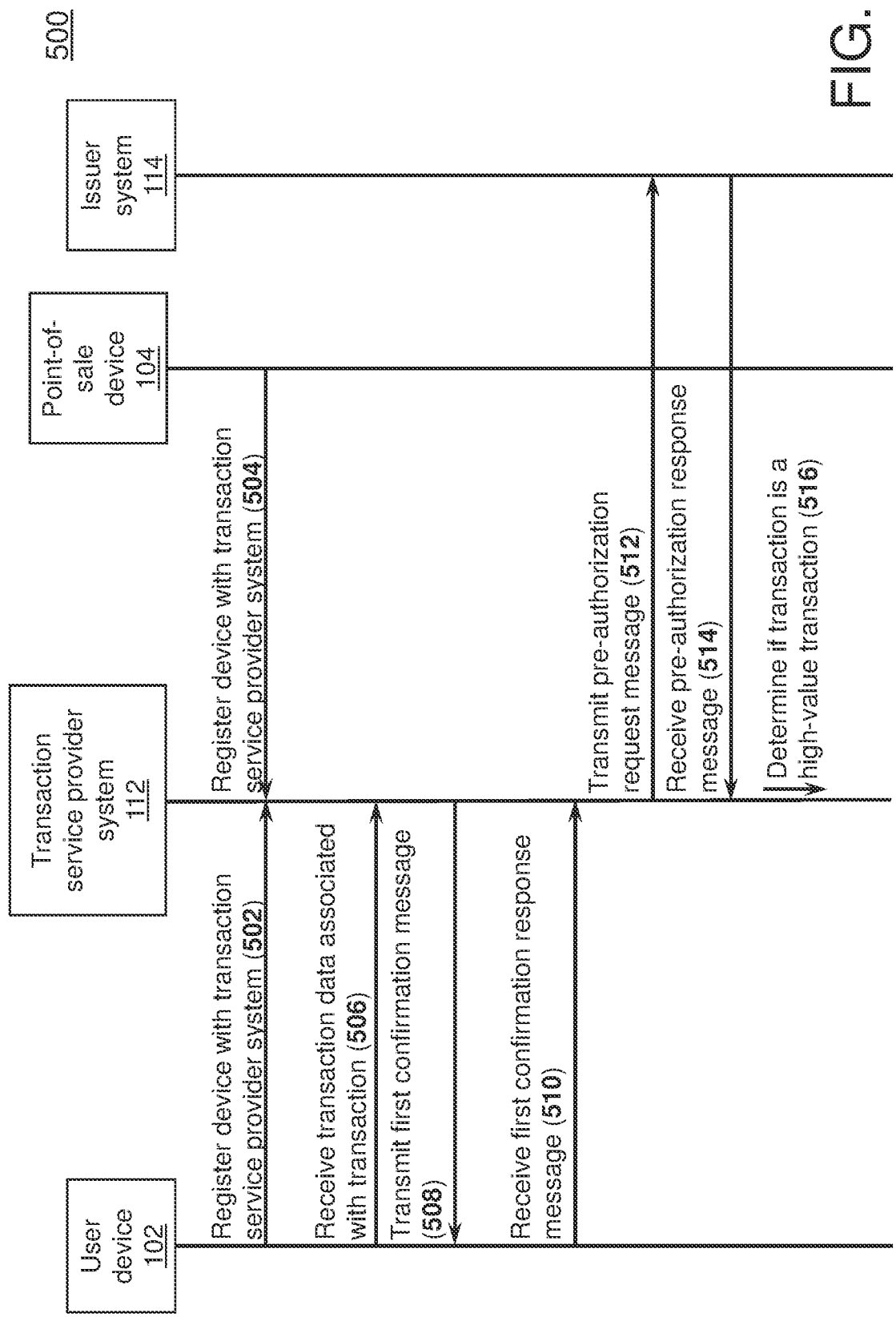

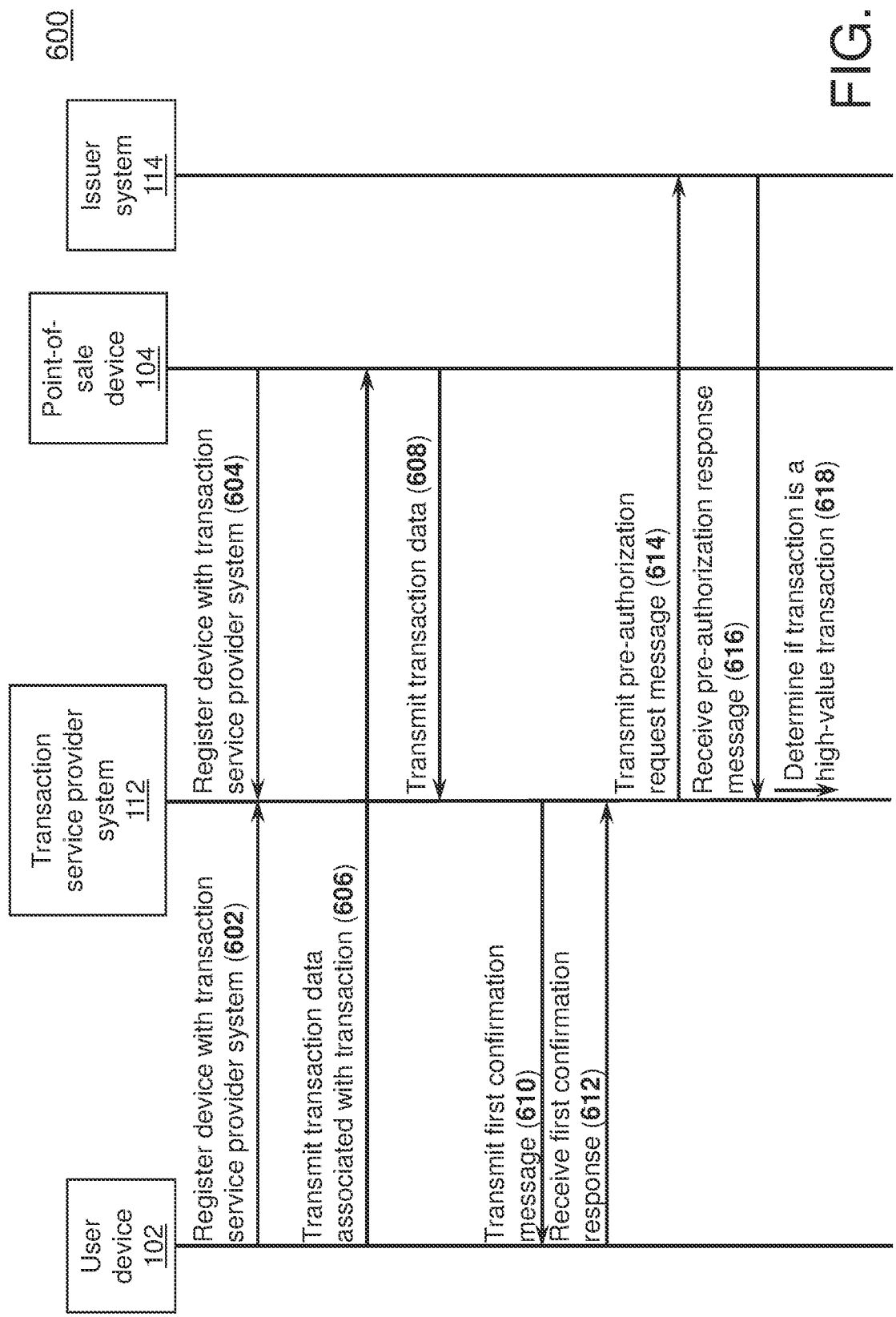

SYSTEMS AND METHODS FOR COMMUNICATING TRANSACTION DATA BETWEEN MOBILE DEVICES

CROSS-REFERENCE TO RELATED APPLICATIONS

This application is a continuation of U.S. patent application Ser. No. 17/625,411, filed Jul. 10, 2019, which is the national phase of International Application No. PCT/US2019/041164 filed Jul. 10, 2019, the disclosures of which are hereby incorporated by reference in their entirety.

BACKGROUND

1. Technical Field

This disclosure relates generally to transaction processing and, in some non-limiting aspects or embodiments, to systems, methods, and computer program products for communicating transaction data between mobile devices.

2. Technical Considerations

Mobile point-of-sale (POS) systems have been developed to enable individuals to process payment transactions. For example, mobile POS systems may connect to mobile devices such as tablets or smartphones that are configured to communicate information to and from the internet via wired or wireless data connections (e.g., WiFi®, third-generation (3G) mobile networks, fourth-generation (4G) mobile networks, and/or the like). Such mobile POS systems may read information from credit cards or debit cards and, in response, communicate such information, along with other transaction-specific data, via the wired or wireless data connections to a remote system for processing.

However, similar to traditional POS systems, once the mobile POS systems read the information from the credit or debit cards, the transaction may be finalized by having the buyer in possession of the credit or debit card engage the mobile device to input additionally-requested information (e.g., a personal identification number (PIN) and/or a signature). As a result, communication with the buyer, particularly via the mobile device, may be limited once payment information is communicated to the POS terminal. Parties such as transaction service providers, issuer institutions, and acquirer institutions, in turn, may rely on only the information received at the mobile POS terminal while the buyer is present to verify the accuracy of the credit or debit card information. This reliance may lead to increases in transaction processing time, both at the POS terminal (when waiting for additional input from the user) and while the transaction is being processed by the transaction service provider.

SUMMARY

Accordingly, provided are improved systems, devices, products, apparatus, and/or methods for communicating transaction data between mobile devices.

According to non-limiting aspects or embodiments, provided is a computer-implemented method for communicating transaction data between mobile devices that may include registering, with at least one processor, account data associated with a merchant account as corresponding to short message service (SMS) device data associated with a point-of-sale (POS) device; registering, with at least one processor, account data associated with a user account as corresponding to SMS device data associated with a user device; receiving, with at least one processor via an SMS communication connection, transaction data associated with a transaction from the POS device, comprising: the SMS device data associated with the POS device, the SMS device data associated with the user device, and parameter data associated with the transaction, the transaction initiated by the POS device, the parameter data comprising a transaction value, verifying, with at least one processor, that the POS device and the user device are registered; based on determining, with at least one processor, that an account balance of the user account is greater than the transaction value, transmitting, with at least one processor, a first confirmation message associated with the transaction, via an SMS communication connection, to the user device to confirm the transaction; and based on receiving, with at least one processor, a first confirmation response message associated with the transaction from the user device via an SMS communication connection, processing, with at least one processor, the transaction data.

In some non-limiting aspects or embodiments, computer implemented methods may include, based on determining that the transaction authorization limit is greater than an authorization limit threshold, transmitting, with at least one processor, a second confirmation message associated with the transaction to the user device; and based on receiving a second confirmation response message associated with the transaction, confirming, with at least one processor and prior to processing the transaction data, that the second confirmation response is valid.

According to some non-limiting aspects or embodiments, registering account data associated with the account as corresponding to SMS device data associated with the user device may include registering, with at least one processor, confirmation data associated with confirmation of the transaction, the confirmation data corresponding to the SMS device data associated with a user device.

In some non-limiting aspects or embodiments, computer-implemented methods may include, determining, with at least one processor, that the second confirmation response message indicates that the transaction is valid based on a comparison of the second confirmation response message to the confirmation data received during registration of the account data associated with the account corresponding to the SMS device data associated with a user device.

According to some non-limiting aspects or embodiments, verifying the POS device and the user device are registered may include determining, with at least one processor, that the SMS device data associated with the POS device corresponds to the account data associated with a merchant account; and determining, with at least one processor, that the SMS device data associated with the user device corresponds to the account data associated with a user account.

In some non-limiting aspects or embodiments, computer implemented methods may include, based on receiving the transaction data associated with the transaction, transmitting, with at least one processor, a transaction parameter confirmation message; and based on receiving transaction parameter confirmation response message indicating that the transaction is authorized, transmitting, with at least one processor, a pre-authorization message associated with the transaction.

According to some non-limiting aspects or embodiments, computer implemented methods may include, based on receiving the transaction data associated with the transaction, transmitting, with at least one processor, a pre-authorization request message associated with the transaction; and based on receiving a pre-authorization response message associated with the transaction indicating the transaction is not authorized, transmitting, with at least one processor, a message associated with the transaction to the POS device, the message indicating that the transaction was not authorized.

In some non-limiting aspects or embodiments, verifying the POS device and the user device are registered may include, based on determining that at least one of the POS device and the user device are not registered, transmitting, with at least one processor, a message associated with the transaction to the at least one of the POS device and the user device indicating that the at least one of the POS device and the user device are not registered.

According to non-limiting aspects or embodiments, provided is a system for communicating transaction data between mobile devices that may include at least one processor programmed or configured to register account data associated with a merchant account as corresponding to short message service (SMS) device data associated with a point-of-sale (POS) device; register account data associated with a user account as corresponding to SMS device data associated with a user device; receive, via an SMS communication connection, transaction data associated with a transaction from the POS device, comprising: the SMS device data associated with the POS device, the SMS device data associated with the user device, and parameter data associated with the transaction, the transaction initiated by the POS device, the parameter data comprising a transaction value, verify that the POS device and the user device are registered; based on determining, with at least one processor, that an account balance of the user account is greater than the transaction value, transmitting, with at least one processor, a first confirmation message associated with the transaction, via an SMS communication connection, to the user device to confirm the transaction; and based on receiving, with at least one processor, a first confirmation response message associated with the transaction from the user device via an SMS communication connection, processing, with at least one processor, the transaction data.

In some non-limiting aspects or embodiments, the at least one processor may be further programmed or configured to, based on determining that the transaction authorization limit is greater than an authorization limit threshold, transmit a second confirmation message associated with the transaction to the user device; and based on receiving a second confirmation response message associated with the transaction, confirm, prior to processing the transaction data, that the second confirmation response is valid.

According to some non-limiting aspects or embodiments, when registering account data associated with the account as corresponding to SMS device data associated with the user device, the at least one processor may be programmed or configured to register confirmation data associated with confirmation of the transaction, the confirmation data corresponding to the SMS device data associated with a user device.

In some non-limiting aspects or embodiments, the at least one processor may be further programmed or configured to determine that the second confirmation response message indicates that the transaction is valid based on a comparison of the second confirmation response message to the confirmation data received during registration of the account data associated with the account corresponding to the SMS device data associated with a user device.

According to some non-limiting aspects or embodiments, the at least one processor may be further programmed or configured to: determine that the SMS device data associated with the POS device corresponds to the account data associated with a merchant account; and determine that the SMS device data associated with the user device corresponds to the account data associated with a user account.

In some non-limiting aspects or embodiments, the at least one processor may be further programmed or configured to, based on receiving the transaction data associated with the transaction, transmit a transaction parameter confirmation message; and based on receiving transaction parameter confirmation response message indicating that the transaction is authorized, transmit a pre-authorization message associated with the transaction.

According to some non-limiting aspects or embodiments, the at least one processor may be further programmed or configured to, based on receiving the transaction data associated with the transaction, transmit a pre-authorization request message associated with the transaction; and in response to receiving a pre-authorization response message associated with the transaction indicating the transaction is not authorized, transmit a message associated with the transaction to the POS device, the message indicating that the transaction was not authorized.

In some non-limiting aspects or embodiments, when verifying the POS device and the user device are registered, the at least one processor may be programmed or configured to: based on determining that at least one of the POS device and the user device are not registered, transmit a message associated with the transaction to the at least one of the POS device and the user device indicating that the at least one of the POS device and the user device are not registered According to non-limiting aspects or embodiments, provided is a computer-program product for communicating transaction data between mobile devices, the computer program product comprising at least one non-transitory computer-readable medium comprising one or more instructions that, when executed by at least one processor, cause the at least one processor to: register account data associated with a merchant account as corresponding to short message service (SMS) device data associated with a point-of-sale (POS) device; register account data associated with a user account as corresponding to SMS device data associated with a user device; receive, via an SMS communication connection, transaction data associated with a transaction from the POS device, comprising: the SMS device data associated with the POS device, the SMS device data associated with the user device, and parameter data associated with the transaction, the transaction initiated by the POS device, the parameter data comprising a transaction value, verify that the POS device and the user device are registered; based on determining, with at least one processor, that an account balance of the user account is greater than the transaction value, transmitting, with at least one processor, a first confirmation message associated with the transaction, via an SMS communication connection, to the user device to confirm the transaction; and based on receiving, with at least one processor, a first confirmation response message associated with the transaction from the user device via an SMS communication connection, processing, with at least one processor, the transaction data.

In some non-limiting aspects or embodiments, the one or more instructions may further cause the at least one processor to, based on determining that the transaction authorization limit is greater than an authorization limit threshold, transmit a second confirmation message associated with the transaction to the user device; and based on receiving a second confirmation response message associated with the transaction, confirm, prior to processing the transaction data, that the second confirmation response is valid.

According to some non-limiting aspects or embodiments, the one or more instructions that cause the at least one processor to register account data associated with the account as corresponding to SMS device data associated with the user device cause the at least one processor to: register confirmation data associated with confirmation of the transaction, the confirmation data corresponding to the SMS device data associated with a user device.

In some non-limiting aspects or embodiments, the one or more instructions may further cause the at least one processor to: determine that the second confirmation response message indicates that the transaction is valid based on a comparison of the second confirmation response message to the confirmation data received during registration of the account data associated with the account corresponding to the SMS device data associated with a user device.

According to some non-limiting aspects or embodiments, the one or more instructions that cause the at least one processor to verify that the POS device and the user device are registered may cause the at least one processor to determine that the SMS device data associated with the POS device corresponds to the account data associated with a merchant account; and determine that the SMS device data associated with the user device corresponds to the account data associated with a user account.

In some non-limiting aspects or embodiments, the one or more instructions may further cause the at least one processor to, based on receiving the transaction data associated with the transaction, transmit a transaction parameter confirmation message; and based on receiving transaction parameter confirmation response message indicating that the transaction is authorized, transmit a pre-authorization message associated with the transaction.

According to some non-limiting aspects or embodiments, the one or more instructions may further cause the at least one processor to, based on receiving the transaction data associated with the transaction, transmit a pre-authorization request message associated with the transaction; and in response to receiving a pre-authorization response message associated with the transaction indicating the transaction is not authorized, transmit a message associated with the transaction to the POS device, the message indicating that the transaction was not authorized.

In some non-limiting aspects or embodiments, the one or more instructions that cause the at least one processor to verify that the POS device and the user device are registered may cause the at least one processor to, based on determining that at least one of the POS device and the user device are not registered, transmit a message associated with the transaction to the at least one of the POS device and the user device indicating that the at least one of the POS device and the user device are not registered.

Further non-limiting aspects or embodiments are set forth in the following numbered clauses:

Clause 1: A computer-implemented method for communicating transaction data between mobile devices, the computer-implemented method comprising: registering, with at least one processor, account data associated with a merchant account as corresponding to short message service (SMS) device data associated with a point-of-sale (POS) device; registering, with at least one processor, account data associated with a user account as corresponding to SMS device data associated with a user device; receiving, with at least one processor via an SMS communication connection, transaction data associated with a transaction from the POS device, comprising: the SMS device data associated with the POS device, the SMS device data associated with the user device, and parameter data associated with the transaction, the transaction initiated by the POS device, the parameter data comprising a transaction value, verifying, with at least one processor, that the POS device and the user device are registered; based on determining, with at least one processor, that an account balance of the user account is greater than the transaction value, transmitting, with at least one processor, a first confirmation message associated with the transaction, via an SMS communication connection, to the user device to confirm the transaction; and based on receiving, with at least one processor, a first confirmation response message associated with the transaction from the user device via an SMS communication connection, processing, with at least one processor, the transaction data.

Clause 2: The computer-implemented method according to clause 1, further comprising: based on determining that the transaction authorization limit is greater than an authorization limit threshold, transmitting, with at least one processor, a second confirmation message associated with the transaction to the user device; and based on receiving a second confirmation response message associated with the transaction, confirming, with at least one processor and prior to processing the transaction data, that the second confirmation response is valid.

Clause 3: The computer-implemented method according to clauses 1 or 2, wherein registering account data associated with the account as corresponding to SMS device data associated with the user device further comprises: registering, with at least one processor, confirmation data associated with confirmation of the transaction, the confirmation data corresponding to the SMS device data associated with a user device.

Clause 4: The computer-implemented method according to any of clauses 1-3, further comprising: determining, with at least one processor, that the second confirmation response message indicates that the transaction is valid based on a comparison of the second confirmation response message to the confirmation data received during registration of the account data associated with the account corresponding to the SMS device data associated with a user device.

Clause 5: The computer-implemented method according to any of clauses 1-4, wherein verifying the POS device and the user device are registered further comprises: determining, with at least one processor, that the SMS device data associated with the POS device corresponds to the account data associated with a merchant account; and determining, with at least one processor, that the SMS device data associated with the user device corresponds to the account data associated with a user account.

Clause 6: The computer-implemented method according to any of clauses 1-5, further comprising: based on receiving the transaction data associated with the transaction, transmitting, with at least one processor, a transaction parameter confirmation message; and based on receiving transaction parameter confirmation response message indicating that the transaction is authorized, transmitting, with at least one processor, a pre-authorization message associated with the transaction.

Clause 7: The computer-implemented method according to any of clauses 1-6, further comprising: based on receiving the transaction data associated with the transaction, transmitting, with at least one processor, a pre-authorization request message associated with the transaction; and in response to receiving a pre-authorization response message associated with the transaction indicating the transaction is not authorized, transmitting, with at least one processor, a message associated with the transaction to the POS device, the message indicating that the transaction was not authorized.

Clause 8: The computer-implemented method according to any of clauses 1-7, wherein verifying the POS device and the user device are registered further comprises: based on determining that at least one of the POS device and the user device are not registered, transmitting, with at least one processor, a message associated with the transaction to the at least one of the POS device and the user device indicating that the at least one of the POS device and the user device are not registered.

Clause 9: A system for communicating transaction data between mobile devices, the system comprising: at least one processor programmed or configured to: register account data associated with a merchant account as corresponding to short message service (SMS) device data associated with a point-of-sale (POS) device; register account data associated with a user account as corresponding to SMS device data associated with a user device; receive, via an SMS communication connection, transaction data associated with a transaction from the POS device, comprising: the SMS device data associated with the POS device, the SMS device data associated with the user device, and parameter data associated with the transaction, the transaction initiated by the POS device, the parameter data comprising a transaction value, verify that the POS device and the user device are registered; based on determining, with at least one processor, that an account balance of the user account is greater than the transaction value, transmitting, with at least one processor, a first confirmation message associated with the transaction, via an SMS communication connection, to the user device to confirm the transaction; and based on receiving, with at least one processor, a first confirmation response message associated with the transaction from the user device via an SMS communication connection, processing, with at least one processor, the transaction data.

Clause 10: The system according to clause 9, wherein the at least one processor is further programmed or configured to: based on determining that the transaction authorization limit is greater than an authorization limit threshold, transmit a second confirmation message associated with the transaction to the user device; and based on receiving a second confirmation response message associated with the transaction, confirm, prior to processing the transaction data, that the second confirmation response is valid.

Clause 11: The system according to clauses 9 or 10, wherein, when registering account data associated with the account as corresponding to SMS device data associated with the user device, the at least one processor is programmed or configured to: register confirmation data associated with confirmation of the transaction, the confirmation data corresponding to the SMS device data associated with a user device.

Clause 12: The system according to any of clauses 9-11, wherein the at least one processor is further programmed or configured to: determine that the second confirmation response message indicates that the transaction is valid based on a comparison of the second confirmation response message to the confirmation data received during registration of the account data associated with the account corresponding to the SMS device data associated with a user device.

Clause 13: The system according to any of clauses 9-12, wherein, when verifying the POS device and the user device are registered, the at least one processor is programmed or configured to: determine that the SMS device data associated with the POS device corresponds to the account data associated with a merchant account; and determine that the SMS device data associated with the user device corresponds to the account data associated with a user account.

Clause 14: The system according to any of clauses 9-13, wherein the at least one processor is further programmed or configured to: based on receiving the transaction data associated with the transaction, transmit a transaction parameter confirmation message; and based on receiving transaction parameter confirmation response message indicating that the transaction is authorized, transmit a pre-authorization message associated with the transaction.

Clause 15: The system according to any of clauses 9-14, wherein the at least one processor is further programmed or configured to: based on receiving the transaction data associated with the transaction, transmit a pre-authorization request message associated with the transaction; and in response to receiving a pre-authorization response message associated with the transaction indicating the transaction is not authorized, transmit a message associated with the transaction to the POS device, the message indicating that the transaction was not authorized.

Clause 16: The system according to any of clauses 9-15, wherein, when verifying the POS device and the user device are registered, the at least one processor is programmed or configured to: based on determining that at least one of the POS device and the user device are not registered, transmit a message associated with the transaction to the at least one of the POS device and the user device indicating that the at least one of the POS device and the user device are not registered.

Clause 17: A computer-program product for communicating transaction data between mobile devices, the computer program product comprising at least one non-transitory computer-readable medium comprising one or more instructions that, when executed by at least one processor, cause the at least one processor to: register account data associated with a merchant account as corresponding to short message service (SMS) device data associated with a point-of-sale (POS) device; register account data associated with a user account as corresponding to SMS device data associated with a user device; receive, via an SMS communication connection, transaction data associated with a transaction from the POS device, comprising: the SMS device data associated with the POS device, the SMS device data associated with the user device, and parameter data associated with the transaction, the transaction initiated by the POS device, the parameter data comprising a transaction value, verify that the POS device and the user device are registered; based on determining, with at least one processor, that an account balance of the user account is greater than the transaction value, transmitting, with at least one processor, a first confirmation message associated with the transaction, via an SMS communication connection, to the user device to confirm the transaction; and based on receiving, with at least one processor, a first confirmation response message associated with the transaction from the user device via an SMS communication connection, processing, with at least one processor, the transaction data.

Clause 18: The computer program product according to clause 17, wherein the one or more instructions further cause the at least one processor to: based on determining that the transaction authorization limit is greater than an authorization limit threshold, transmit a second confirmation message associated with the transaction to the user device; and based on receiving a second confirmation response message associated with the transaction, confirm, prior to processing the transaction data, that the second confirmation response is valid.

Clause 19: The computer program product according to clauses 17 or 18, wherein the one or more instructions that cause the at least one processor to register account data associated with the account as corresponding to SMS device data associated with the user device cause the at least one processor to: register confirmation data associated with confirmation of the transaction, the confirmation data corresponding to the SMS device data associated with a user device.

Clause 20: The computer program product according to any of clauses 17-19, wherein the one or more instructions further cause the at least one processor to: determine that the second confirmation response message indicates that the transaction is valid based on a comparison of the second confirmation response message to the confirmation data received during registration of the account data associated with the account corresponding to the SMS device data associated with a user device.

Clause 21: The computer program product according to any of clauses 17-20, wherein the one or more instructions that cause the at least one processor to verify that the POS device and the user device are registered cause the at least one processor to: determine that the SMS device data associated with the POS device corresponds to the account data associated with a merchant account; and determine that the SMS device data associated with the user device corresponds to the account data associated with a user account.

Clause 22: The computer program product according to any of clauses 17-21, wherein the one or more instructions further cause the at least one processor to: based on receiving the transaction data associated with the transaction, transmit a transaction parameter confirmation message; and based on receiving transaction parameter confirmation response message indicating that the transaction is authorized, transmit a pre-authorization message associated with the transaction.

Clause 23: The computer program product according to any of clauses 17-22, wherein the one or more instructions further cause the at least one processor to: based on receiving the transaction data associated with the transaction, transmit a pre-authorization request message associated with the transaction; and in response to receiving a pre-authorization response message associated with the transaction indicating the transaction is not authorized, transmit a message associated with the transaction to the POS device, the message indicating that the transaction was not authorized.

Clause 24: The computer program product according to any of clauses 17-23, wherein the one or more instructions that cause the at least one processor to verify that the POS device and the user device are registered cause the at least one processor to: based on determining that at least one of the POS device and the user device are not registered, transmit a message associated with the transaction to the at least one of the POS device and the user device indicating that the at least one of the POS device and the user device are not registered.

Clause 25: A computer-implemented method for communicating transaction data between mobile devices, the computer-implemented method comprising: registering, with at least one processor, account data associated with a merchant account as corresponding to device data associated with a mobile point-of-sale (POS) device; registering, with at least one processor, account data associated with a user account as corresponding to electronic wallet device data associated with a user device; receiving, with at least one processor via a data connection, transaction data associated with a transaction from the POS device, comprising: the device data associated with the POS device, the electronic wallet device data associated with the user device, and parameter data associated with the transaction, the transaction initiated by the POS device, the parameter data comprising a transaction value, verifying, with at least one processor, that the POS device and the user device are registered; based on determining, with at least one processor, that an account balance of the user account is greater than the transaction value, transmitting, with at least one processor, a first confirmation message associated with the transaction, via a data connection, to the user device to confirm the transaction; and based on receiving, with at least one processor, a first confirmation response message associated with the transaction from the user device via a data connection, processing, with at least one processor, the transaction data.

Clause 26: The computer-implemented method according to clause 25, further comprising: based on determining that the transaction value is greater than an authorization limit threshold, transmitting, with at least one processor, a second confirmation message associated with the transaction to the user device; and based on receiving a second confirmation response message associated with the transaction, confirming, with at least one processor and prior to processing the transaction data, that the second confirmation response is valid.

Clause 27: The computer-implemented method according to clauses 25 or 26, wherein registering account data associated with the account as corresponding to electronic wallet device data associated with the user device further comprises: registering, with at least one processor, confirmation data associated with confirmation of the transaction, the confirmation data corresponding to the electronic wallet device data associated with a user device.

Clause 28: The computer-implemented method according to any of clauses 25-27, further comprising: determining, with at least one processor, that the second confirmation response message indicates that the transaction is valid based on a comparison of the second confirmation response message to the confirmation data received during registration of the account data associated with the account corresponding to the electronic wallet device data associated with a user device.

Clause 29: The computer-implemented method according to any of clauses 25-28, wherein verifying the POS device and the user device are registered further comprises: determining, with at least one processor, that the electronic wallet device data associated with the POS device corresponds to the account data associated with a merchant account; and determining, with at least one processor, that the electronic wallet device data associated with the user device corresponds to the account data associated with a user account.

Clause 30: The computer-implemented method according to any of clauses 25-29, further comprising: based on receiving the transaction data associated with the transaction, transmitting, with at least one processor, a transaction parameter confirmation message; and based on receiving transaction parameter confirmation response message indicating that the transaction is authorized, transmitting, with at least one processor, a pre-authorization message associated with the transaction.

Clause 31: The computer-implemented method according to any of clauses 25-30, further comprising: based on receiving the transaction data associated with the transaction, transmitting, with at least one processor, a pre-authorization request message associated with the transaction; and in response to receiving a pre-authorization response message associated with the transaction indicating the transaction is not authorized, transmitting, with at least one processor, a message associated with the transaction to the POS device, the message indicating that the transaction was not authorized.

Clause 32: The computer-implemented method according to any of clauses 25-31, wherein verifying the POS device and the user device are registered further comprises: based on determining that at least one of the POS device and the user device are not registered, transmitting, with at least one processor, a message associated with the transaction to the at least one of the POS device and the user device indicating that the at least one of the POS device and the user device are not registered.

Clause 33. A system for communicating transaction data between mobile devices, the system comprising: at least one processor programmed or configured to: register account data associated with a merchant account as corresponding to device data associated with a mobile point-of-sale (POS) device; register account data associated with a user account as corresponding to electronic wallet device data associated with a user device; receive, via data connection, transaction data associated with a transaction from the POS device, comprising: the device data associated with the POS device, the electronic wallet device data associated with the user device, and parameter data associated with the transaction, the transaction initiated by the POS device, the parameter data comprising a transaction value, verify that the POS device and the user device are registered; based on determining that an account balance of the user account is greater than the transaction value, transmit a first confirmation message associated with the transaction, via a data connection, to the user device to confirm the transaction; and based on receiving a first confirmation response message associated with the transaction from the user device via a data connection, process the transaction data.

Clause 34: The system according to clause 33, wherein the at least one processor is further programmed or configured to: based on determining that the transaction value is greater than an authorization limit threshold, transmit a second confirmation message associated with the transaction to the user device; and based on receiving a second confirmation response message associated with the transaction, confirm, prior to processing the transaction data, that the second confirmation response is valid.

Clause 35: The system according to clauses 33 or 34, wherein, when registering account data associated with the account as corresponding to electronic wallet device data associated with the user device the at least one processor is programmed or configured to: register confirmation data associated with confirmation of the transaction, the confirmation data corresponding to the electronic wallet device data associated with a user device.

Clause 36: The system according to any of clauses 33-35, wherein the at least one processor is further programmed or configured to: determine that the second confirmation response message indicates that the transaction is valid based on a comparison of the second confirmation response message to the confirmation data received during registration of the account data associated with the account corresponding to the electronic wallet device data associated with a user device.

Clause 37: The system according to any of clauses 33-36, wherein, when verifying the POS device and the user device are registered, the at least one processor is programmed or configured to: determine that the electronic wallet device data associated with the POS device corresponds to the account data associated with a merchant account; and determine that the electronic wallet device data associated with the user device corresponds to the account data associated with a user account.

Clause 38: The system according to any of clauses 33-37, wherein the at least one processor is further programmed or configured to: based on receiving the transaction data associated with the transaction, transmit a transaction parameter confirmation message; and based on receiving transaction parameter confirmation response message indicating that the transaction is authorized, transmit a pre-authorization message associated with the transaction.

Clause 39: The system according to any of clauses 33-38, wherein the at least one processor is further programmed or configured to: based on receiving the transaction data associated with the transaction, transmit a pre-authorization request message associated with the transaction; and in response to receiving a pre-authorization response message associated with the transaction indicating the transaction is not authorized, transmit a message associated with the transaction to the POS device, the message indicating that the transaction was not authorized.

Clause 40: The system according to any of clauses 33-39, wherein, when verifying the POS device and the user device are registered, the at least one processor is programmed or configured to: based on determining that at least one of the POS device and the user device are not registered, transmit a message associated with the transaction to the at least one of the POS device and the user device indicating that the at least one of the POS device and the user device are not registered.

Clause 41: A computer-program product for communicating transaction data between mobile devices, the computer program product comprising at least one non-transitory computer-readable medium comprising one or more instructions that, when executed by at least one processor, cause the at least one processor to: register account data associated with a merchant account as corresponding to device data associated with a mobile point-of-sale (POS) device; register account data associated with a user account as corresponding to electronic wallet device data associated with a user device; receive, via data connection, transaction data associated with a transaction from the POS device, comprising: the device data associated with the POS device, the electronic wallet device data associated with the user device, and parameter data associated with the transaction, the transaction initiated by the POS device, the parameter data comprising a transaction value, verify that the POS device and the user device are registered; based on determining that an account balance of the user account is greater than the transaction value, transmit a first confirmation message associated with the transaction, via a data connection, to the user device to confirm the transaction; and based on receiving a first confirmation response message associated with the transaction from the user device via a data connection, process the transaction data.

Clause 42: The computer-program product according to clause 41, wherein the one or more instructions further cause the at least one processor to: based on determining that the transaction value is greater than an authorization limit threshold, transmit a second confirmation message associated with the transaction to the user device; and based on receiving a second confirmation response message associated with the transaction, confirm, prior to processing the transaction data, that the second confirmation response is valid.

Clause 43: The computer-program product according to clauses 41 or 42, wherein the one or more instructions that cause the at least one processor to register account data associated with the account as corresponding to electronic wallet device data associated with the user device cause the at least one processor to: register confirmation data associated with confirmation of the transaction, the confirmation data corresponding to the electronic wallet device data associated with a user device.

Clause 44: The computer-program product according to any of clauses 41-43, wherein the one or more instructions further cause the at least one processor to: determine that the second confirmation response message indicates that the transaction is valid based on a comparison of the second confirmation response message to the confirmation data received during registration of the account data associated with the account corresponding to the electronic wallet device data associated with a user device.

Clause 45: The computer-program product according to any of clauses 41-44, wherein the one or more instructions that cause the at least one processor to verify that the POS device and the user device are registered cause the at least one processor to: determine that the electronic wallet device data associated with the POS device corresponds to the account data associated with a merchant account; and determine that the electronic wallet device data associated with the user device corresponds to the account data associated with a user account.

Clause 46: The computer-program product according to any of clauses 41-45, wherein the one or more instructions further cause the at least one processor to: based on receiving the transaction data associated with the transaction, transmit a transaction parameter confirmation message; and based on receiving transaction parameter confirmation response message indicating that the transaction is authorized, transmit a pre-authorization message associated with the transaction.

Clause 47: The computer-program product according to any of clauses 41-46, wherein the one or more instructions further cause the at least one processor to: based on receiving the transaction data associated with the transaction, transmit a pre-authorization request message associated with the transaction; and in response to receiving a pre-authorization response message associated with the transaction indicating the transaction is not authorized, transmit a message associated with the transaction to the POS device, the message indicating that the transaction was not authorized.

Clause 48: The computer-program product according to any of clauses 41-47, wherein the one or more instructions that cause the at least one processor to verify the POS device and the user device are registered cause the at least one processor to: based on determining that at least one of the POS device and the user device are not registered, transmit a message associated with the transaction to the at least one of the POS device and the user device indicating that the at least one of the POS device and the user device are not registered.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a", "an", and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which:

FIGS. 5A and 5B are diagrams of an implementation of non-limiting aspects or embodiments of the process shown in FIGS. 3A and 3B; and FIGS. 6A and 6B are diagrams of an implementation of non-limiting aspects or embodiments of the process shown in FIGS. 3A and 3B.

DETAILED DESCRIPTION

Figure 1:
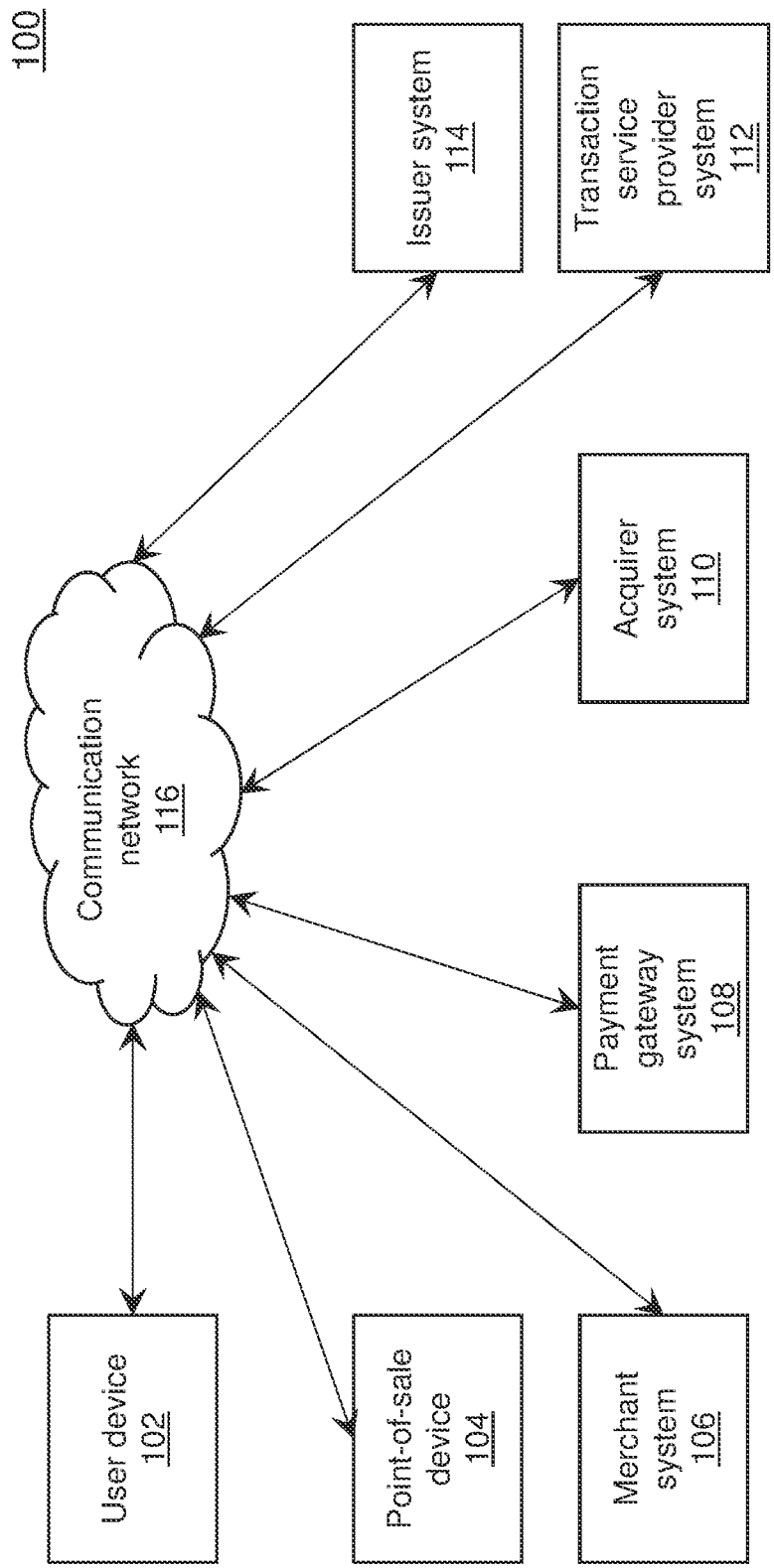
FIG. 1 is a diagram of non-limiting aspects or embodiments of a system for communicating transaction data between mobile devices.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting aspects or embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting aspects or embodiments, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting aspects or embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting aspects or embodiments, the account identifier may be an original account identifier, where the original account identifier was provided to a user at the creation of the account associated with the account identifier. In some non-limiting aspects or embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting aspects or embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting aspects or embodiments, an original account identifier, such as a PAN, may be associated with a plurality of tokens for different individuals or purposes. In some non-limiting aspects or embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "POS system" may refer to one or more client devices and/or peripheral devices used by a merchant to conduct a transaction. For example, a POS system may include one or more POS devices and/or other like devices that may be used to conduct a payment transaction. In some non-limiting aspects or embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting aspects or embodiments, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting aspects or embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting aspects or embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices, such as an autonomous vehicle including a vehicle computing system, directly or indirectly communicating in the network environment may constitute a "system" or a "computing system."

As used herein, the terms "client" and "client device" may refer to one or more computing devices, such as processors, storage devices, and/or similar computer components, that access a service made available by a server. In some non-limiting aspects or embodiments, a "client device" may refer to one or more devices that facilitate payment transactions, such as POS devices and/or POS systems used by a merchant. In some non-limiting aspects or embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components, that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for communicating transaction data between mobile devices. In some non-limiting aspects or embodiments, a user device and a POS device may register with a transaction service provider system to enable the transaction service provider system to coordinate transactions therebetween. Registration may include, among other steps, identifying a correspondence between account data associated with an account (e.g., an account of a consumer or a merchant) and device data associated with a device (e.g., the user device or the POS device). In such an example, the device data may include a unique device identifier (e.g., a phone number, media access control (MAC) address, and/or the like) that is associated with the account data registered to that device by the transaction service provider system. As a result, where the user device or POS device are unable to communicate with one another (e.g., where one or the other computing device is only able to communicate during a transaction via an SMS messaging service and the other is only able to communicate via a data connection), the transaction service provider system may act as an intermediary and enable communication therebetween. This, in turn, reduces and/or eliminates the need for the regression to legacy transaction processing techniques (e.g., the use of paper money and/or other paper financial instruments that may be more readily misplaced, misread, and/or the like), and allows for quicker and more secure access to systems for performing transactions (e.g., a transaction service provider system).

Referring now to FIG. 1, illustrated is a diagram of a system 100 for communicating transaction data between mobile devices according to non-limiting aspects or embodiments. As illustrated in FIG. 1, system 100 comprises user device 102, point-of-sale (POS) device 104, merchant system 106, payment gateway system 108, acquirer system 110, transaction service provider system 112, issuer system 114, and communication network 116. User device 102, POS device 104, merchant system 106, payment gateway system 108, acquirer system 110, transaction service provider system 112, and/or issuer system 114 may be in communication via communication network 116 and/or one or more wired connections, wireless connections, or a combination of wired and wireless connections. Although FIG. 1 shows all of the components of the system 100 communicating with communication network 116, it will be appreciated that multiple communication networks may be used and that some components may not communicate through the same network.

User device 102 may include a computing device configured to communicate with POS device 104, merchant system 106, payment gateway system 108, acquirer system 110, transaction service provider system 112, and/or issuer system 114 via communication network 116 and/or other networks. User device 102 may be configured to transmit and/or receive data to and/or from POS device 104 via a short-range wireless communication connection (e.g., an NFC communication connection, an RFID communication connection, a Bluetooth® communication connection, and/or the like). In some non-limiting aspects or embodiments, user device 102 may be configured to communicate data to and/or from POS device 104, payment gateway system 108, and/or transaction service provider system 112 via a short message service (SMS) communication connection (e.g., a communication connection for transmitting and/or receiving SMS messages) and/or a data connection (e.g., a 2G, 3G, 4G, LTE network, and/or the like for transmitting and/or receiving data messages such as, without limitation, multimedia messaging service (MMS) messages, and/or other the like). In some non-limiting aspects or embodiments, user device 102 may be associated with a user (e.g., an individual operating a device). In some non-limiting aspects or embodiments, user device 102 may be a payment device configured to communicate with POS device 104 via a short-range wireless communication connection.

POS device 104 may include a computing device configured to be in communication with user device 102, merchant system 106, payment gateway system 108, acquirer system 110, transaction service provider system 112, and/or issuer system 114 via communication network 116 and/or other networks. POS device 104 may be configured to transmit and/or receive data to and/or from user device 102 via a short-range wireless communication connection. In some non-limiting aspects or embodiments, POS device 104 may be configured to communicate data to and/or from user device 102, merchant system 106, payment gateway system 108, and/or transaction service provider system 112 via a short message service (SMS) communication connection and/or a data connection. In some non-limiting aspects or embodiments, POS device 104 may be associated with a merchant as described herein.

Merchant system 106 may include one or more computing devices configured to communicate with user device 102, POS device 104, payment gateway system 108, acquirer system 110, transaction service provider system 112, and/or issuer system 114 via communication network 116 and/or other networks. For example, merchant system 106 may include one or more computing devices configured to transmit and/or receive data to and/or from user device 102 and/or POS device 104 via communication network 116, such as a server, a group of servers, a client device, a group of client devices, and/or other like devices. In some non-limiting aspects or embodiments, POS device 104 may be part of merchant system 106. In some non-limiting aspects or embodiments, merchant system 106 may be associated with a merchant as described herein.

Payment gateway system 108 may include one or more computing devices configured to communicate with user device 102, POS device 104, merchant system 106, acquirer system 110, transaction service provider system 112, and/or issuer system 114 via communication network 116 and/or other networks. For example, payment gateway system 108 may include a server, a group of servers, and/or other like devices. In some non-limiting aspects or embodiments, payment gateway system 108 may be configured to transmit and/or receive data to and/or from user device 102, POS device 104, and/or transaction service provider system 112 via an SMS communication connection and/or a data connection. In some non-limiting aspects or embodiments, payment gateway system 108 may be associated with a payment gateway as described herein.

Acquirer system 110 may include one or more computing devices configured to communicate with user device 102, POS device 104, merchant system 106, payment gateway system 108, transaction service provider system 112, and/or issuer system 114 via communication network 116 and/or other networks. For example, acquirer system 110 may include a server, a group of servers, and/or other like devices. In some non-limiting aspects or embodiments, acquirer system 110 may be associated with an acquirer as described herein.

Transaction service provider system 112 may include one or more computing devices configured to communicate with user device 102, POS device 104, merchant system 106, payment gateway system 108, acquirer system 110, and/or issuer system 114 via communication network 116 and/or other networks. For example, transaction service provider system 112 may include a server (e.g., a transaction processing server), a group of servers, and/or other like devices. In some non-limiting aspects or embodiments, transaction service provider system 112 may be associated with a transaction service provider as described herein. In some non-limiting aspects or embodiments, transaction service provider system 112 may be configured to communicate data to and/or from user device 102, POS device 104, and/or payment gateway system 108 via an SMS communication connection and/or a data connection.

Issuer system 114 may include one or more computing devices capable of being in communication with user device 102, POS device 104, merchant system 106, payment gateway system 108, acquirer system 110, and/or transaction service provider system 112 via communication network 116 and/or other networks. For example, issuer system 114 may include a server, a group of servers, and/or other like devices. In some non-limiting aspects or embodiments, issuer system 114 may be associated with an issuer institution that issued a payment account or instrument (e.g., a credit account, a debit account, a credit card, a debit card, etc.) to a user (e.g., a user associated with user device 102, and/or the like).

Communication network 116 may include one or more wired and/or wireless networks. For example, communication network 116 may include a cellular network (e.g., a long-term evolution (LTE) network, a third generation (3G) network, a fourth-generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems, devices, and networks shown in FIG. 1 are provided as an example. There may be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 may be implemented within a single system or a single device, or a single system or a single device shown in FIG. 1 may be implemented as multiple, distributed systems or devices. Additionally, or alternatively, a set of systems or a set of devices (e.g., one or more systems, one or more devices) of system 100 may perform one or more functions described as being performed by another set of systems or another set of devices of system 100.

In some non-limiting aspects or embodiments, transaction data associated with a transaction may include transaction parameters associated with the transaction, such as payment transactions initiated and/or conducted with a computing device (e.g., via an internet browser of a computing device), with an electronic wallet application, and/or the like. Non-limiting examples of transaction parameters include: electronic wallet card data associated with a payment device and/or account identifier, decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, password, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the payment device or account, data associated with a response code, data associated with a merchant identifier (e.g., a merchant name, a merchant location, and/or the like), data associated with a type of currency corresponding to funds stored in association with the PAN, and/or the like.

Figure 2:
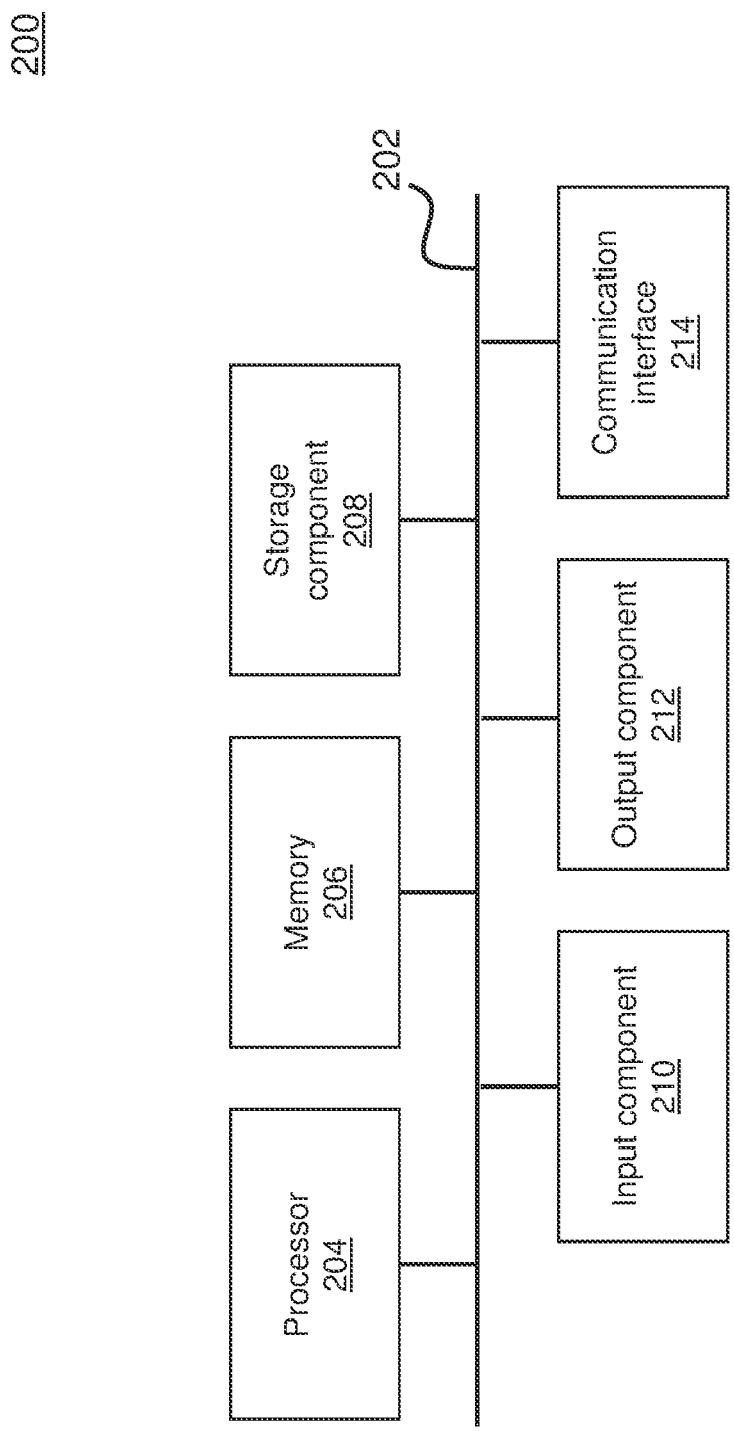
FIG. 2 is a diagram of non-limiting aspects or embodiments of components of one or more devices illustrated by FIG. 1.

Referring now to FIG. 2, illustrated is a diagram of example components of device 200. Device 200 may correspond to one or more devices of the user device 102, one or more devices of POS device 104, one or more devices of merchant system 106, one or more devices of payment gateway system 108, one or more devices of acquirer system 110, one or more devices of transaction service provider system 112, one or more devices of issuer system 114, and/or one or more devices of communication network 116. In some non-limiting aspects or embodiments, one or more devices of user device 102, one or more devices of POS device 104, one or more devices of merchant system 106, one or more devices of payment gateway system 108, one or more devices of acquirer system 110, one or more devices of transaction service provider system 112, one or more devices of issuer system 114, and/or one or more devices of communication network 116 can include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting aspects or embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting aspects or embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
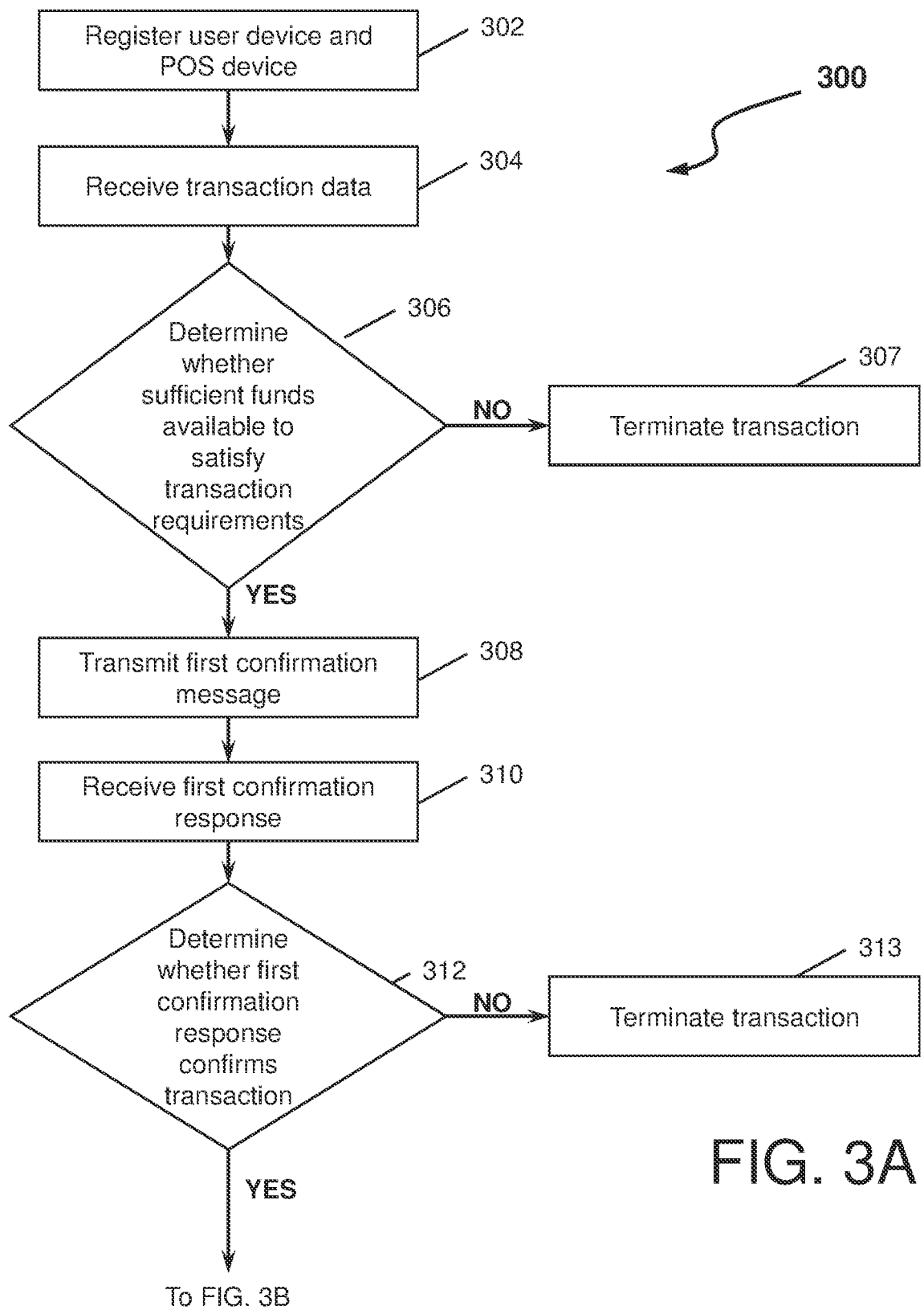
FIGS. 3A and 3B are flow diagrams of a process for communicating transaction data between mobile devices.
Figure 3B:
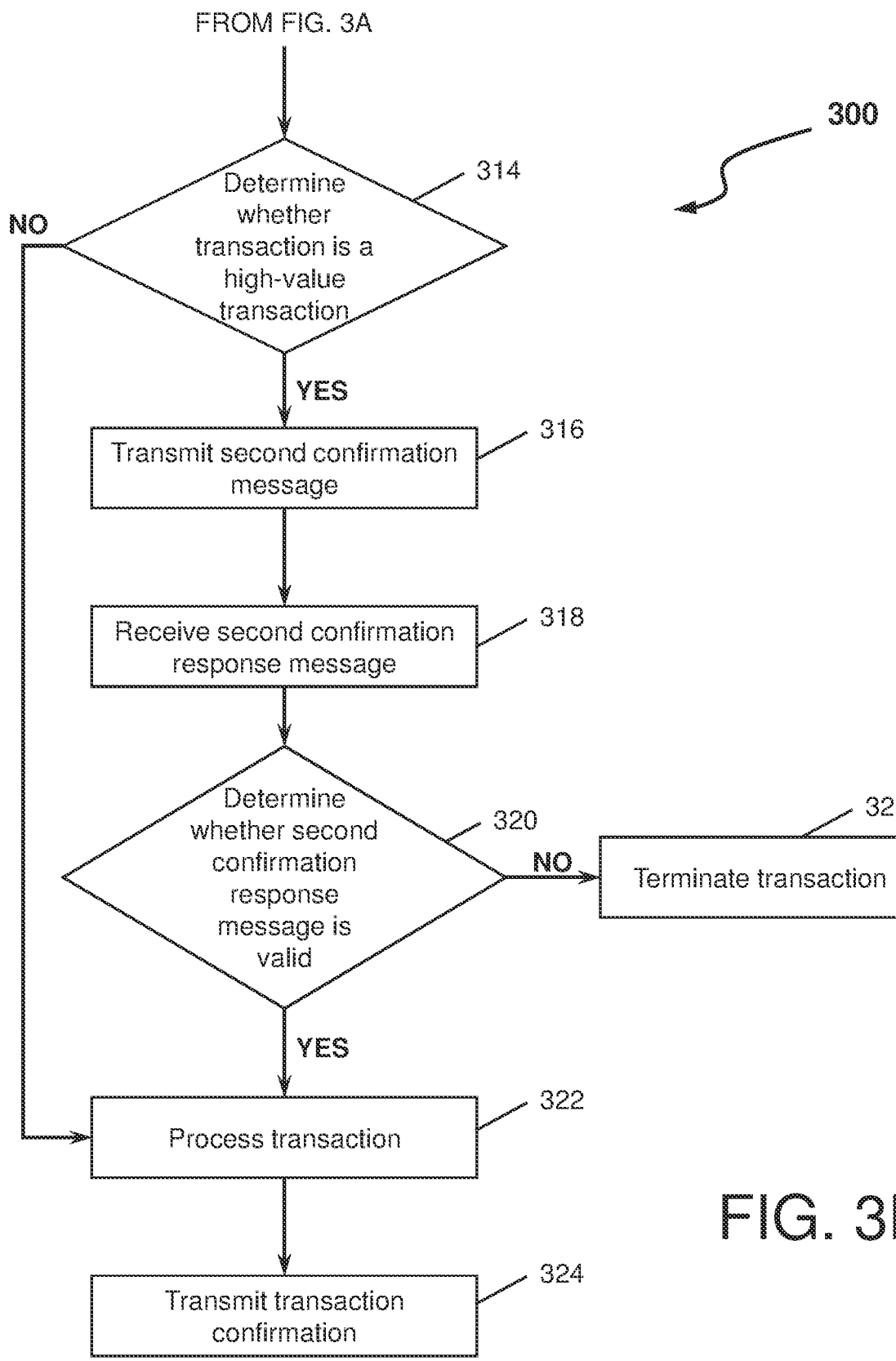

Referring now to FIGS. 3A and 3B, and with continued reference to FIG. 1, illustrated is a flow diagram of a process 300 for communicating transaction data between mobile devices. In some non-limiting aspects or embodiments, one or more steps and/or operations associated with process 300 may be performed (e.g., completely or partially) by user device 102, POS device 104, and/or transaction service provider system 112 (see FIG. 1). In some non-limiting aspects or embodiments, one or more of the steps and/or operations associated with process 300 may be performed (e.g., completely or partially) by another device or group of devices separate from, or including, merchant system 106, payment gateway system 108, acquirer system 110, and/or issuer system 114. In some non-limiting aspects or embodiments, user device 102 may be used as a POS device as described herein and/or POS device 104 may be used as a user device as described herein.

As described herein, the phrase "push payment" may refer to payments during which a first device (e.g., user device 102, POS device 104, and/or the like) initiates a transaction to transfer funds from an account associated with the first device to an account associated with a second device (e.g., another of user device 102, POS device 104, and/or the like). Similarly, as described herein, the phrase "pull payment" may refer to payments during which a first device (e.g., user device 102, POS device 104, and/or the like) initiates a transaction to transfer funds from an account associated with a second device (e.g., another of user device 102, POS device 104, and/or the like) to an account associated with the first device. Accordingly, in some non-limiting aspects or embodiments, user device 102 and/or POS device 104 may both initiate a push payment or a pull payment.

As shown in FIG. 3A, at step 302, process 300 may include registering user device 102 and POS device 104. In some non-limiting aspects or embodiments, transaction service provider system 112 may register user device 102 and POS device 104. For example, transaction service provider system 112 may receive account data associated with an account of a user (e.g., a credit account, a debit account, a currency associated with a credit or debit account, and/or the like) as well as device data associated with user device 102, the device data including a unique device identifier (e.g., a phone number, media access control (MAC) address, and/or the like) from user device 102. Similarly, transaction service provider system 112 may receive account data associated with an account of a merchant as well as device data associated with POS device 104 from POS device 104. In some non-limiting aspects or embodiments, a user with user device 102 and/or a merchant associated with POS device 104 may initiate a telephone call (e.g., using user device 102, POS device 104, and/or another computing device capable of initiating telephone calls) to transaction service provider system 112 to register user device 102 and/or POS device 104. In such examples, transaction service provider system 112 may receive account data and a unique device identifier from user device 102 and/or POS device 104 based on the user and/or the merchant providing input to user device 102 and/or POS device 104.

In some non-limiting aspects or embodiments, transaction service provider system 112 may receive confirmation data associated with confirmation of a transaction, the confirmation data including a unique confirmation code (e.g., a personal identification number (PIN), a predetermined code (e.g., a card verification code (CVC), and/or the like), data associated with a Consumer Device Cardholder Verification Method (CDCVM)), and/or the like from user device 102 and/or POS device 104. In such an example, transaction service provider system 112 may later compare data received from user device 102 and/or POS device 104 during a transaction to the confirmation data received during registration of user device 102 and/or POS device 104 to determine whether the individual operating user device 102 and/or POS device 104 is authorized to do so and, by extension, whether or not the transaction is a valid transaction. In some non-limiting aspects or embodiments, transaction service provider system 112 may register an application with user device 102 and/or POS device 104. For example, transaction service provider system 112 may register the application before or after the application is installed on user device 102 and/or POS device 104, and the application may be used to facilitate communication of data between user device 102 and/or POS device 104 during a transaction as described herein.

In some non-limiting aspects or embodiments, user device 102 and/or POS device 104 may be registered with an issuer system 114. For example, an individual may provide device data associated with a user device to issuer system 114 (e.g., in person, via a telephone call, and/or the like). In such an example, issuer system 114 may associate the device data associated with the user device with account data associated with the account of the user. Additionally, or alternatively, an individual may provide device data associated with a POS device to issuer system 114 (e.g., in person, via a telephone call, and/or the like). In such an example, issuer system 114 may associate the device data associated with the POS device with account data associated with the account of the merchant. In such examples, the individual registering the device data with issuer system 114 may also register confirmation data associated with confirmation of a transaction with issuer system 114. Additionally, or alternatively, issuer system 114 may associate the device data of user device 102 and/or POS device 104 with an account token corresponding to the account of the user and/or the account of the merchant, respectively.

In some non-limiting aspects or embodiments, transaction service provider system 112 may store account data associated with an account of a user in relation to device data associated with user device 102. Additionally, or alternatively, in some non-limiting aspects or embodiments, transaction service provider system 112 may store account data associated with an account of a merchant in relation to device data associated with POS device 104. As a result of storing the account data in association with the device data for user device 102 and POS device 104, transaction service provider system 112 may determine that account data associated with the account of the user corresponds to device data associated with the user device and/or that the account data associated with the account of the merchant corresponds to device data associated with POS device 104. In some non-limiting aspects or embodiments, transaction service provider system 112 may transmit the account token corresponding to account data of the user to user device 102 and/or transmit the account token corresponding to account data of the merchant to POS device 104.

As further shown in FIG. 3A, at step 304, process 300 may include receiving transaction data associated with a transaction. In some non-limiting aspects or embodiments, transaction service provider system 112 may receive transaction data associated with a transaction from user device 102 and/or POS device 104. The transaction data associated with the transaction may comprise: device data associated with the device transmitting the transaction data (e.g., user device 102, POS device 104, and/or the like), device data associated with a device corresponding to an account to or from which funds are to be transferred (e.g., user device 102, POS device 104, and/or the like), and/or parameter data associated with the transaction (e.g., a description of goods and/or services purchased, a value of goods and/or services purchased, a transaction value, and/or the like). In some non-limiting aspects or embodiments, user device 102 and/or POS device 104 may generate transaction data based on receiving input from user device 102 and/or POS device 104. In some non-limiting aspects or embodiments, user device 102 and/or POS device 104 may generate and transmit an SMS message and/or a data message to transaction service provider system 112. For example, user device 102 and/or POS device 104 may generate and transmit an SMS message and/or a data message to transaction service provider system 112, the SMS message and/or the data message including the transaction data associated with the transaction. In such an example, user device 102 and/or POS device 104 may transmit the SMS message and/or the data message via an SMS communication connection and/or a data communication, respectively, to transaction service provider system 112.

In some non-limiting aspects or embodiments, prior to transaction service provider system 112 receiving transaction data, user device 102 and/or POS device 104 may communicate with each other via a short-range wireless communication connection and/or via communication network 116 in order to exchange the transaction data associated with a transaction. For example, user device 102 may establish a short-range wireless communication connection with POS device 104 and, upon establishment, transmit device data associated with user device 102 and/or transaction parameters associated with the transaction to POS device 104. In some non-limiting aspects or embodiments, user device 102 and/or POS device 104 may determine that the other of user device 102 and/or POS device 104 is not registered with transaction service provider system 112. For example, user device 102 and/or POS device 104 may determine that the other of user device 102 and/or POS device 104 is not registered with transaction service provider system 112 by transmitting the transaction data associated with the transaction to transaction service provider system 112. In such an example, user device 102 and/or POS device 104 may receive a message from transaction service provider system 112 indicating that user device 102 and/or POS device 104 are not registered with transaction service provider system 112.

In some non-limiting aspects or embodiments, transaction service provider system 112 may determine that a device associated with a transaction is not registered with transaction service provider system 112 (e.g., that user device 102 and/or POS device 104 are not registered with transaction service provider system 112). For example, transaction service provider system 112 may determine that user device 102 and/or POS device 104 are not registered with transaction service provider system 112 and, based on the determination, transmit a message associated with the transaction to user device 102 and/or POS device 104 to indicate that user device 102 and/or POS device 104 are not registered with transaction service provider system 112. In some non-limiting aspects or embodiments, transaction service provider system 112 may transmit a message including instructions for how to register with transaction service provider system 112 based on determining that the device is not registered with transaction service provider system 112.

In some non-limiting aspects or embodiments, transaction service provider system 112 may determine that an account corresponds to a transaction. For example, transaction service provider system 112 may determine that an account corresponds to a transaction based on receiving the transaction data associated with the transaction from user device 102 or POS device 104. In such an example, transaction service provider system 112 may determine that a transaction authorization limit (e.g., a limit up to which transactions may be processed with funds from an account) applies to the transaction.

As further shown in FIG. 3A, at step 306, process 300 may include determining whether sufficient funds are available to satisfy a transaction. In some non-limiting aspects or embodiments, transaction service provider system 112 may determine whether sufficient funds are available to satisfy a transaction based on determining the transaction authorization limit applies to the transaction. In some non-limiting aspects or embodiments, to determine that the transaction authorization limit applies to the transaction, transaction service provider system 112 may transmit a pre-authorization request message to issuer system 114 requesting a transaction authorization limit for the transaction and, based on transmitting the pre-authorization request message, may receive a pre-authorization response message including the transaction authorization limit. Additionally, or alternatively, transmitting the pre-authorization request message associated with the transaction to issuer system 114 may cause issuer system 114 to transmit a pre-authorization response message including an indication as to what amount of funds are available for the transaction. Where transaction service provider system 112 determines that sufficient funds are available to satisfy a transaction (e.g., that the transaction authorization limit is greater than a transaction amount; "YES" at step 306), a first confirmation message associated with confirmation of the transaction data may be transmitted. Alternatively, where transaction service provider system 112 determines that sufficient funds are not available to satisfy the transaction (e.g., that the transaction authorization limit is less than the transaction amount; "NO" at step 306), at step 307 transaction service provider system 112 may terminate the transaction. In some non-limiting aspects or embodiments, transaction service provider system 112 may transmit a message indicating the transaction was terminated to user device 102 and/or POS device 104.

As further shown in FIG. 3A, at step 308, process 300 may include transmitting a first confirmation message associated with confirmation of transaction data associated with a transaction. In some non-limiting aspects or embodiments, transaction service provider system 112 may transmit a first confirmation message associated with confirmation of a transaction to confirm that the transaction data is correct. For example, transaction service provider system 112 may transmit the first confirmation message to user device 102 and/or POS device 104 to confirm that the transaction data is correct. In such an example, user device 102 and/or POS device 104 may display a prompt to cause an individual and/or a merchant to input, via user device 102 and/or POS device 104, respectively, an indication that the transaction data is correct or not correct. For example, where transaction service provider system 112 receives transaction data associated with a transaction from POS device 104 requesting that funds be transferred from an account associated with user device 102 to an account associated with POS device 104 (e.g., a request to initiate a pull payment), transaction service provider system 112 may generate the first confirmation message associated with confirmation of the transaction and transmit the first confirmation message to user device 102 to confirm the transaction data is correct. Alternatively, for example, where transaction service provider system 112 receives transaction data associated with a transaction from user device 102 requesting that funds be transferred from the account associated with user device 102 to the account associated with POS device 104 (e.g., request to initiate a push payment), transaction service provider system 112 may generate a first confirmation message associated with confirmation of the transaction and send the first confirmation message to POS device 104 to confirm the transaction data is correct. In some non-limiting aspects or embodiments transaction service provider system 112 may transmit a first confirmation message as an SMS message and/or a data message to user device 102 and/or POS device 104 via an SMS communication connection and/or a data communication, respectively.

In some non-limiting aspects or embodiments, a first confirmation response message associated with confirmation of a transaction may be generated. For example, user device 102 and/or POS device 104 may generate a first confirmation response message associated with confirmation of the transaction. In such an example, user device 102 and/or POS device 104 may generate the first confirmation response message associated with a transaction based on receiving the indication that the transaction data is or is not correct. In such examples, user device 102 and/or POS device 104 may transmit the first confirmation response message to transaction service provider system 112.

As further shown in FIG. 3A, at step 310, process 300 may include receiving a first confirmation response message. In some non-limiting aspects or embodiments, transaction service provider system 112 may receive a first confirmation response message indicating that the transaction data is or is not correct and, by extension, is or is not approved. In such an example, the first confirmation message may be transmitted by user device 102 or POS device 104 to transaction service provider system 112. In some non-limiting aspects or embodiments, user device 102 or POS device 104 may transmit the first confirmation response message to transaction service provider system 112 as an SMS message and/or a data message via an SMS communication connection and/or a data communication, respectively.

As further shown in FIG. 3A, at step 312, process 300 may include determining whether a first confirmation response message confirms a transaction. In some non-limiting aspects or embodiments, transaction service provider system 112 may determine that the first confirmation response message confirms a transaction. In some non-limiting aspects or embodiments, transaction service provider system 112 may generate a message associated with the transaction based on determining that the first confirmation response message confirms the transaction. For example, transaction service provider system 112 may generate a message associated with a transaction indicating that a transaction was approved or not approved and, after generation, may transmit the message to user device 102 and/or POS device 104. As further shown in FIG. 3, at step 313, process 300 may include terminating a transaction. In some non-limiting aspects or embodiments, transaction service provider system 112 may terminate the transaction based on the first confirmation response message.

As shown in FIG. 3B, at step 314, process 300 may include determining whether a transaction is a high-value transaction. In some non-limiting aspects or embodiments, transaction service provider system 112 may determine that a transaction is a high-value transaction (e.g., the transaction is associated with a transaction amount greater than a predetermined value, and/or the like). For example, in some non-limiting aspects or embodiments, transaction service provider system 112 may determine that a transaction is a high-value transaction based on the transaction parameters included in the transaction data associated with the transaction. In some non-limiting aspects or embodiments, transaction service provider system 112 may determine that the transaction is a high-value transaction based on receiving the first confirmation response message.

In some non-limiting aspects or embodiments, a second confirmation message associated with a transaction may be generated to confirm the identity of an individual operating a device during the transaction. For example, transaction service provider system 112 may generate the second confirmation message. In some non-limiting aspects or embodiments, transaction service provider system 112 may generate the second confirmation message based on determining that the transaction is a high-value transaction. In one such example, POS device 104 may transmit transaction data associated with a transaction requesting funds be transferred from an account associated with a user to an account associated with a merchant (e.g., a pull request), and based on receiving the transaction data, transaction service provider system 112 may generate a second confirmation message to be sent to user device 102 to confirm the identity of the user operating user device 102. In another example, where user device 102 transmits transaction data associated with a transaction requesting funds be transferred from an account of a user to an account of a merchant (e.g., a push request), transaction service provider system 112 may generate the second confirmation message to be sent to user device 102 to confirm the identity of the individual operating user device 102.

In some non-limiting aspects or embodiments, transaction service provider system 112 may generate the second confirmation message based on determining that one or more transactions were processed that were not high-value transactions. For example, transaction service provider system 112 may determine that one or more transactions processed within a predetermined period of time leading up to the current transaction satisfies a transaction threshold amount (e.g., an amount of transactions less than, equal to, or greater than a predetermined amount). Where transaction service provider system 112 determines that the one or more transactions processed within a predetermined period of time leading up to the current transaction satisfies a transaction threshold amount, transaction service provider system 112 may generate and transmit the second confirmation message to user device 102 and/or POS device 104. Where transaction service provider system 112 determines that the one or more transactions processed within a predetermined period of time leading up to the current transaction does not satisfy a transaction threshold amount, transaction service provider system 112 may not generate the second confirmation message.

In some non-limiting aspects or embodiments, the second confirmation message may include a request for data associated with verification of the identity of an individual. For example, the second confirmation message may include a request for data associated with verification of the identity of an individual operating the device that transmitted the transaction data to transaction service provider system 112. Additionally, or alternatively, the second confirmation message may include a request for data associated with verification of the identity of an individual operating another device involved in the transaction (e.g., where a first device is POS device 104 that is sending a request for funds from an account associated with a second device such as user device 102, the second confirmation message may include a request for data associated with the verification of the identity of an individual operating the another device (e.g., user device 102). In some non-limiting aspects or embodiments, transmitting the request for data associated with verification of the identity of an individual may cause the device that receives the request to generate Consumer Device Cardholder Verification Method (CDCVM) data and transmit the CDCVM data to transaction service provider system 112. For example, transaction service provider system 112 may transmitting the request for data associated with verification of the identity of an individual operating user device 102. In such an example, user device 102 may generate CDCVM data associated with the identity of the individual operating user device 102 (e.g., a fingerprint of the individual, a passcode, and/or the like). User device 102 may transmit the CDCVM data to transaction service provider system 112 to verify the identity of the individual operating user device 102. Similarly, in some non-limiting aspects or embodiments, transaction service provider system 112 may transmitting the request for data associated with verification of the identity of an individual operating POS device 104. In such an example, POS device 104 may generate CDCVM data associated with the identity of the individual operating POS device 104. POS device 104 may transmit the CDCVM data to transaction service provider system 112 to verify the identity of the individual operating POS device 104.

As further shown in FIG. 3B, at step 316, process 300 may include transmitting a second confirmation message. In some non-limiting aspects or embodiments, transaction service provider system 112 may transmit a second confirmation message associated with a transaction to user device 102 and/or POS device 104. In some non-limiting aspects or embodiments, user device 102 and/or POS device 104 may receive input and, based on the input, may generate confirmation data associated with confirmation of the transaction. User device 102 and/or POS device 104 may then generate a second confirmation response message associated with the transaction, and the second confirmation response message may include the confirmation data associated with confirmation of the transaction. In some non-limiting aspects or embodiments, transaction service provider system 112 may transmit the second confirmation message to user device 102 and/or POS device 104 as an SMS message and/or a data message via an SMS communication connection and/or a data communication, respectively.

In some non-limiting aspects or embodiments, confirmation data associated with confirmation of a transaction may include data associated with an identity of an individual operating a device. For example, in some non-limiting aspects or embodiments, confirmation data may include data received as input at user device 102 and/or POS device 104 that may be used to identify an individual operating user device 102 and/or POS device 104. For a detailed description of verifying the identity of an individual, reference may be made to PCT Patent Application No. PCT/GB2019/051011, filed on Apr. 5, 2019, the disclosure of which is hereby incorporated by reference in its entirety.

In some non-limiting aspects or embodiments, transmitting a second confirmation message may include initiating a telephone call between transaction service provider system 112 and user device 102. For example, where user device 102 and/or POS device 104 are configured to communicate via an SMS communication connection, transaction service provider system 112 may cause a telephone call to be initiated (e.g., an automated telephone call) with user device 102 and/or POS device 104 to receive the confirmation data associated with confirmation of the transaction. In such an example, an individual operating user device 102 may communicate with transaction service provider system 112 to provide confirmation data associated with confirmation of the transaction to transaction service provider system 112.

As further shown in FIG. 3B, at step 318, process 300 may include receiving a second confirmation response message associated with a transaction to confirm the transaction. In some non-limiting aspects or embodiments, transaction service provider system 112 may receive a second confirmation response message from user device 102 or POS device 104. In such an example, the second confirmation response message may include the confirmation data associated with confirmation of the transaction. In some non-limiting aspects or embodiments, user device 102 or POS device 104 may transmit the second confirmation response message to transaction service provider system 112 as an SMS message and/or a data message via an SMS communication connection and/or a data communication, respectively.

As further shown in FIG. 3B, at step 320, process 300 may include determining whether a second confirmation response message associated with a transaction indicates that a transaction is valid. In some non-limiting aspects or embodiments, transaction service provider system 112 may determine whether the second confirmation response indicates whether the transaction is valid based on comparing the confirmation data included in the second confirmation response message with the confirmation data received during registration of the device transmitting the second confirmation response message. For example, to determine that the second confirmation response message is valid, transaction service provider system 112 may compare confirmation data included in the second confirmation response message received from user device 102 or POS device 104 with confirmation data received during registration of user device 102 and/or POS device 104, respectively.

As further shown in FIG. 3B, at step 321, process 300 may include terminating a transaction. In some non-limiting aspects or embodiments, transaction service provider system 112 may terminate a transaction based on determining that the transaction is or is not valid. In such an example, the determination that the transaction is or is not valid may include comparing the confirmation data included in the second confirmation response message to the confirmation data received during registration of the device transmitting the second confirmation response. Where transaction service provider system 112 determines that the transaction is not valid, transaction service provider system 112 may terminate the transaction.

In some non-limiting aspects or embodiments, transaction service provider system 112 may re-transmit the second confirmation message to user device 102 and/or POS device 104. For example, transaction service provider system 112 may re-transmit the second confirmation message to user device 102 and/or POS device 104 based on determining that the transaction is or is not valid based on the second confirmation response. In such an example, transaction service provider system 112 may receive another second confirmation response message and, based on the other second confirmation response message, may determine that the transaction is or is not valid.

As further shown in FIG. 3, at step 322, process 300 may include processing a transaction. In some non-limiting aspects or embodiments, transaction service provider system 112 may process a transaction. For example, transaction service provider system 112 may process the transaction based on the transaction data associated with a transaction. In such an example, when processing the transaction, transaction service provider system 112 may generate an authorization request message associated with authorization of the transaction and, upon generation, transmit the authorization request message to issuer system 114. Issuer system 114 may, in response to receiving the authorization request message, generate an authorization response message including an indication as to whether the transaction is approved or not approved, and transmit the authorization response message to transaction service provider system 112.

As further shown in FIG. 3, at step 324, process 300 may include transmitting a transaction confirmation message indicating whether a transaction was successfully processed or not successfully processed. In some non-limiting aspects or embodiments, transaction service provider system 112 may transmit the transaction confirmation message to user device 102 and/or POS device 104. For example, transaction service provider system 112 may transmit the transaction confirmation message to user device 102 and/or POS device 104 based on receiving the authorization response message. The transaction confirmation message may indicate that a transaction was approved or not approved. In some non-limiting aspects or embodiments, transaction service provider system may transmit the transaction confirmation message to user device 102 and/or POS device 104 as an SMS message and/or a data message via an SMS communication connection and/or a data communication, respectively.

In some non-limiting aspects or embodiments, an electronic receipt may be transmitted. For example, POS device 104 may transmit an electronic receipt to user device 102. In such an example, POS device 104 may transmit the electronic receipt upon successful processing of a transaction. POS device 104 may transmit the electronic receipt to an electronic wallet on user device 102 and/or to an application executed on user device 102 from an electronic wallet on POS device 104 and/or an application executed on POS device 104. In some non-limiting aspects or embodiments, where user device 102 and POS device 104 have an application installed thereon to manage communication of transaction data between mobile devices, the application may be configured to automatically transmit and/or receive electronic receipts upon successful processing of a transaction.

In some non-limiting aspects or embodiments, transaction service provider system 112 may transmit historical transaction data associated with one or more historical transactions to user device 102 and/or POS device 104. For example, in some non-limiting aspects or embodiments, user device 102 and/or POS device 104 may receive input indicating a request for historical transaction data associated with one or more historical transactions (e.g., one or more transactions in which user device 102 and/or POS device 104 were used to facilitate a transaction). In some non-limiting aspects or embodiments, user device 102 and/or POS device 104 may transmit a request to transaction service provider system 112 to cause transaction service provider system 112 to transmit the historical transaction data to user device 102 and/or POS device 104. Upon receipt, user device 102 and/or POS device 104 may display the historical transaction data associated with the one or more transactions on an output component of user device 102 and/or POS device 104. In some non-limiting aspects or embodiments, a request may include a request for historical transaction data associated with one or more historical transactions to which the device requesting the historical transaction data was not a direct party (e.g., one or more POS devices 104 operating under the control of a merchant, such as POS devices 104 assigned to one or more employees of a merchant). In some non-limiting aspects or embodiments, transaction service provider system may transmit the historical transaction data associated with the one or more historical transactions to user device 102 and/or POS device 104 by including the historical transaction data associated with the one or more historical transactions in an SMS message and/or a data message transmitted to user device 102 and/or POS device 104 via an SMS communication connection and/or a data communication, respectively.

In some non-limiting aspects or embodiments, transaction service provider system 112 may maintain reports on behalf of POS device 104. For example, transaction service provider system 112 may store data associated with one or more transactions that were processed using POS device 104. In such an example, transaction service provider system 112 may generate one or more reports based on the data associated with the one or more transactions that were processed and transmit the reports to POS device 104 and/or merchant system 106 to enable a merchant operating POS device 104 and/or merchant system 106 to track payments for accounting purposes, for use as proof of business activity when applying for credit, for use when analyzing trends, and/or the like. In some non-limiting aspects or embodiments, another POS device 104a may maintain historical transaction data on behalf of one or more POS devices 104 and/or may generate one or more reports based on the historical transaction data of the one or more POS devices 104.

Figure 4:
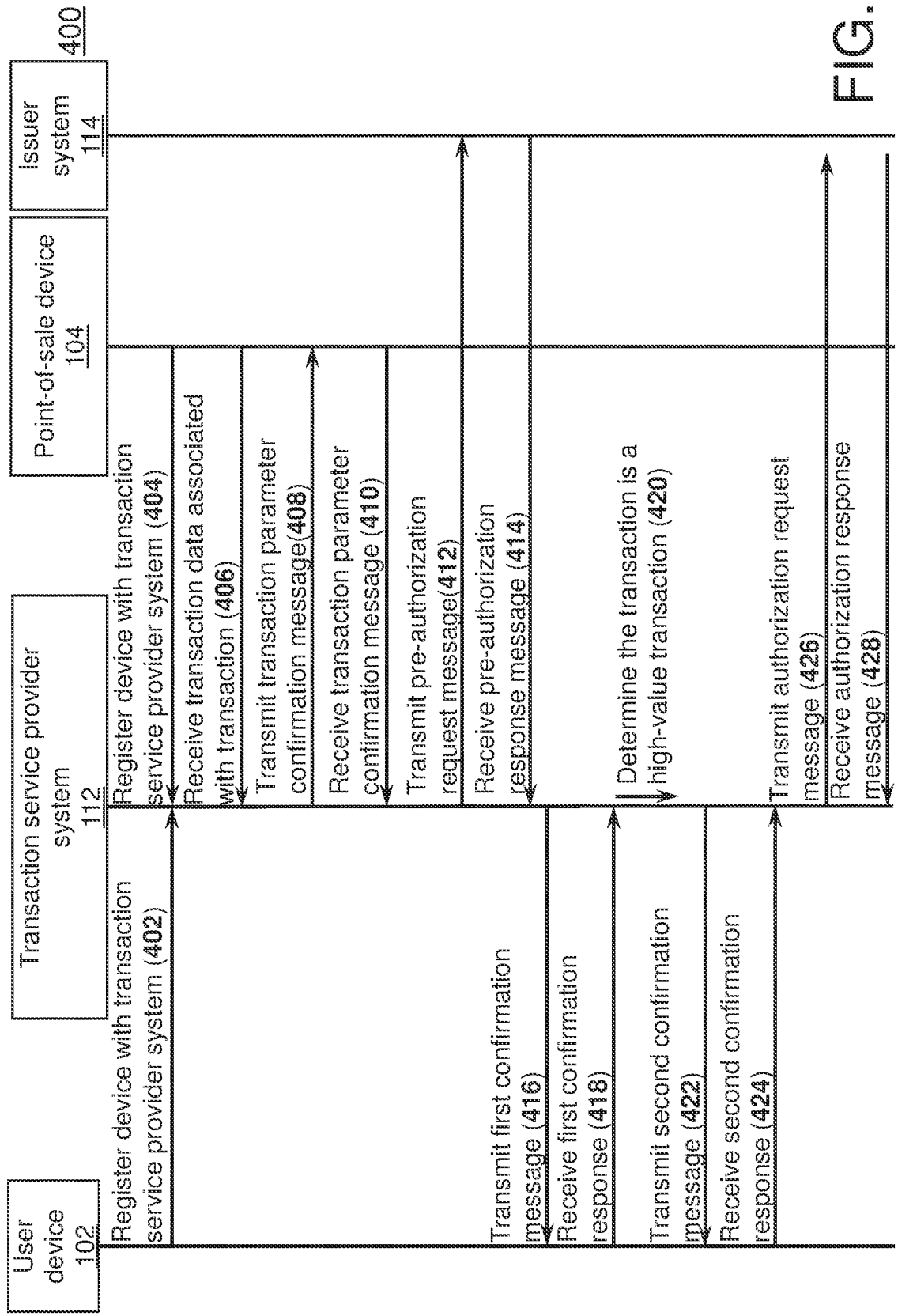
FIG. 4 is a diagram of an implementation of non-limiting aspects or embodiments of the process shown in FIGS. 3A and 3B.

Referring now to FIG. 4, illustrated is an implementation 400 of non-limiting aspects or embodiments of a process for communicating transaction data between mobile devices. As illustrated in FIG. 4, implementation 400 includes user device 102, a POS device 104, transaction service provider system 112, and issuer system 114.

As shown by reference number 402 in FIG. 4, user device 102 may register with transaction service provider system 112. During registration, user device 102 may transmit account data associated with an account of a user as well as device data associated with user device 102 to transaction service provider system 112. In response, transaction service provider system 112 may store the account data associated with the account of the user and the device data associated with user device 102 in association with one another (e.g., in a database of transaction service provider system 112). User device 102 may additionally, or alternatively, transmit confirmation data associated with confirmation of a transaction corresponding to user device 102, and the confirmation data may include a unique confirmation code. In some non-limiting aspects or embodiments, user device 102 may be used to initiate a telephone call to register with transaction service provider system 112 (e.g., via an automated registration system configured to receive account data via audio and/or digital input provided by the user at user device 102). In some non-limiting aspects or embodiments, in response to receiving account data associated with the account of the user and device data associated with user device 102, transaction service provider system 112 may generate an account token and transmit the account token (e.g., as data or over a telephone call), and the account token may be linked to the account of the user and the device data associated with user device 102. In some non-limiting aspects or embodiments, transaction service provider system 112 may transmit confirmation data associated with confirmation of a transaction to user device 102.

As shown by reference number 404 in FIG. 4, POS device 104 may register with transaction service provider system 112. During registration, POS device 104 may transmit account data associated with an account of a merchant as well as device data associated with POS device 104 to transaction service provider system 112. In response, transaction service provider system 112 may store the account data associated with the account of the merchant and the device data associated with POS device 104 in association with one another (e.g., in a database of transaction service provider system 112). POS device 104 may additionally, or alternatively, transmit confirmation data associated with confirmation of a transaction corresponding to POS device 104, the confirmation data including a unique confirmation code. In some non-limiting aspects or embodiments, POS device 104 may be used to initiate a telephone call to register with transaction service provider system 112 (e.g., via an automated registration system configured to receive account data via audio and/or digital input provided by the user at POS device 104). In some non-limiting aspects or embodiments, in response to receiving account data associated with the account of the merchant and device data associated with POS device 104, transaction service provider system 112 may generate an account token and transmit the account token (e.g., as data or over a telephone call), and the account token may be linked to the account of the merchant and the device data associated with POS device 104. In some non-limiting aspects or embodiments, transaction service provider system 112 may transmit confirmation data associated with confirmation of a transaction to POS device 104.

With continued reference to reference numbers 402 and 404 in FIG. 4, transaction service provider system 112 may generate an account token for each device during registration. The account token may be linked to the account data for each respective device. In some non-limiting aspects or embodiments, transaction service provider system 112 may provide confirmation data associated with confirmation of a transaction to user device 102 and/or POS device 104 (e.g., transaction service provider system 112 may generate the confirmation data and transmit the confirmation data to user device 102 and/or POS device 104).

As shown by reference number 406 in FIG. 4, transaction service provider system 112 may receive transaction data associated with a transaction from POS device 104. Transaction data may include device data associated with user device 102, device data associated with POS device 104, and transaction parameters associated with the transaction from POS device 104. Transaction service provider system 112 may generate a pre-authorization request message associated with the transaction based on the transaction data associated with the transaction. In some non-limiting aspects or embodiments, transaction service provider system 112 may determine whether POS device 104 and/or user device 102 are registered and, if not registered, transaction service provider system 112 may transmit a message to POS device 104 and/or user device 102 to prompt registration of POS device 104 and/or user device 102.

As shown by reference number 408 in FIG. 4, transaction service provider system 112 may transmit a parameter confirmation message including data associated with one or more parameters of the transaction to verify the accuracy of the transaction parameters to POS device 104. For example, transaction service provider system 112 may transmit the parameter confirmation message to POS device 104 based on receiving the transaction data associated with the transaction. In such an example, the parameter confirmation message may request a parameter confirmation response message be returned to transaction service provider system 112 indicating whether the transaction parameters associated with the transaction are accurate.

As shown by reference number 410 in FIG. 4, transaction service provider system 112 may receive a transaction parameter confirmation response message from POS device 104. For example, POS device 104 may generate the transaction parameter confirmation response message based on receiving the transaction parameter confirmation message, the transaction confirmation response message indicating whether the transaction parameters associated with the transaction are accurate. In some non-limiting aspects or embodiments, the transaction parameter confirmation response message may be generated based on input received at POS device 104.

As shown by reference number 412 in FIG. 4, transaction service provider system 112 may transmit the pre-authorization request message to issuer system 114. For example, to determine that a transaction is permissible (e.g., that sufficient funds are available to satisfy a transaction) transaction service provider system 112 may transmit a pre-authorization request message to cause issuer system 114 to generate a pre-authorization response message associated with the transaction, the pre-authorization response indicating that sufficient funds are or are not available to satisfy the transaction.

As shown by reference number 414 in FIG. 4, transaction service provider system 112 receives a pre-authorization response message associated with the transaction. The pre-authorization response message may indicate that sufficient funds are or are not available to satisfy the transaction. In some non-limiting aspects or embodiments, transaction service provider system 112 may generate a first confirmation message associated with the transaction based on the pre-authorization response message. In some non-limiting aspects or embodiments, where the pre-authorization response message indicates that sufficient funds are not available, transaction service provider system 112 may transmit a message to user device 102 and/or POS device 104 indicating that insufficient funds are available to satisfy the transaction.

As shown by reference number 416 in FIG. 4, transaction service provider system 112 may transmit the first confirmation message associated with the transaction to user device 102 to confirm transaction parameters of the transaction. In some non-limiting aspects or embodiments, transaction service provider system 112 may transmit the first confirmation message via an SMS communication connection or a data connection to user device 102. User device 102 may generate a first confirmation response based on the first confirmation message. For example, user device 102 may generate a display based on the first confirmation message to prompt a user to input an indication that the transaction is accepted or not accepted. User device 102 may receive input indicating that the transaction is accepted or not accepted and, based on the input, generate the first confirmation response message.

As shown by reference number 418 in FIG. 4, transaction service provider system 112 may receive a first confirmation response message. For example, user device 102 may transmit a first confirmation response message based on receiving input indicating acceptance of a transaction by a user at user device 102. In examples where the first confirmation response message indicates that the transaction is not accepted, transaction service provider system 112 may transmit a message to POS device 104 indicating that the transaction was not accepted.

As shown by reference number 420 in FIG. 4, transaction service provider system 112 may determine that the transaction is a high-value transaction. For example, transaction service provider system 112 may determine the transaction is a high-value transaction based on transaction parameters of the transaction data. Where the transaction is determined to be a high-value transaction (e.g., the transaction value is greater than or equal to a predetermined threshold), transaction service provider system 112 may generate a second confirmation message associated with the transaction. Additionally, or alternatively, where the transaction is determined to be a low-value transaction (e.g., the transaction value is less than or equal to a predetermined threshold), implementation 400 may continue to reference number 426 and transmit an authorization request message to an issuer system 114.

As shown by reference number 422 in FIG. 4, transaction service provider system 112 may transmit the second confirmation message to user device 102. Transaction service provider system 112 may transmit the second confirmation message to user device 102 based on determining that the transaction is a high-value transaction. The second confirmation message may be configured to cause user device 102 to generate a second confirmation response message including confirmation data associated with confirmation of the transaction. User device 102 may generate confirmation data associated with confirmation of the transaction based on input received at user device 102 (e.g., the input may include a unique confirmation code).

As shown by reference number 424 in FIG. 4, transaction service provider system 112 may receive a second confirmation response message from user device 102. For example, in some non-limiting aspects or embodiments, transaction service provider system 112 may receive the second confirmation response message including confirmation data associated with confirmation of the transaction. Transaction service provider system 112 may determine the confirmation data matches confirmation data corresponding to the user device 102 received during registration of user device 102 with the transaction service provider system. Transaction service provider system 112 may then generate an authorization request message associated with the transaction based on the transaction data and then determine that the confirmation data matches confirmation data corresponding to the user device 102 received during registration of user device 102.

As shown by reference number 426 in FIG. 4, transaction service provider system 112 may transmit the authorization request message to issuer system 114. In some non-limiting aspects or embodiments, issuer system 114 may generate an authorization response message based on receiving the authorization request message.

As shown by reference number 428 in FIG. 4, transaction service provider system 112 may receive the authorization response message from issuer system 114. The authorization response message may indicate whether the transaction is approved or not approved. In some non-limiting aspects or embodiments, where the transaction is determined to be a low-value transaction, an authorization request message may be generated based on the determination the transaction is a low-value transaction, without transmission of a second confirmation message and receipt of a second confirmation response by the transaction service provider system 112. In some non-limiting aspects or embodiments, transaction service provider system 112 may transmit a message to user device 102 and/or POS device 104 indicating that the transaction was approved or not approved.

Figure 5B:
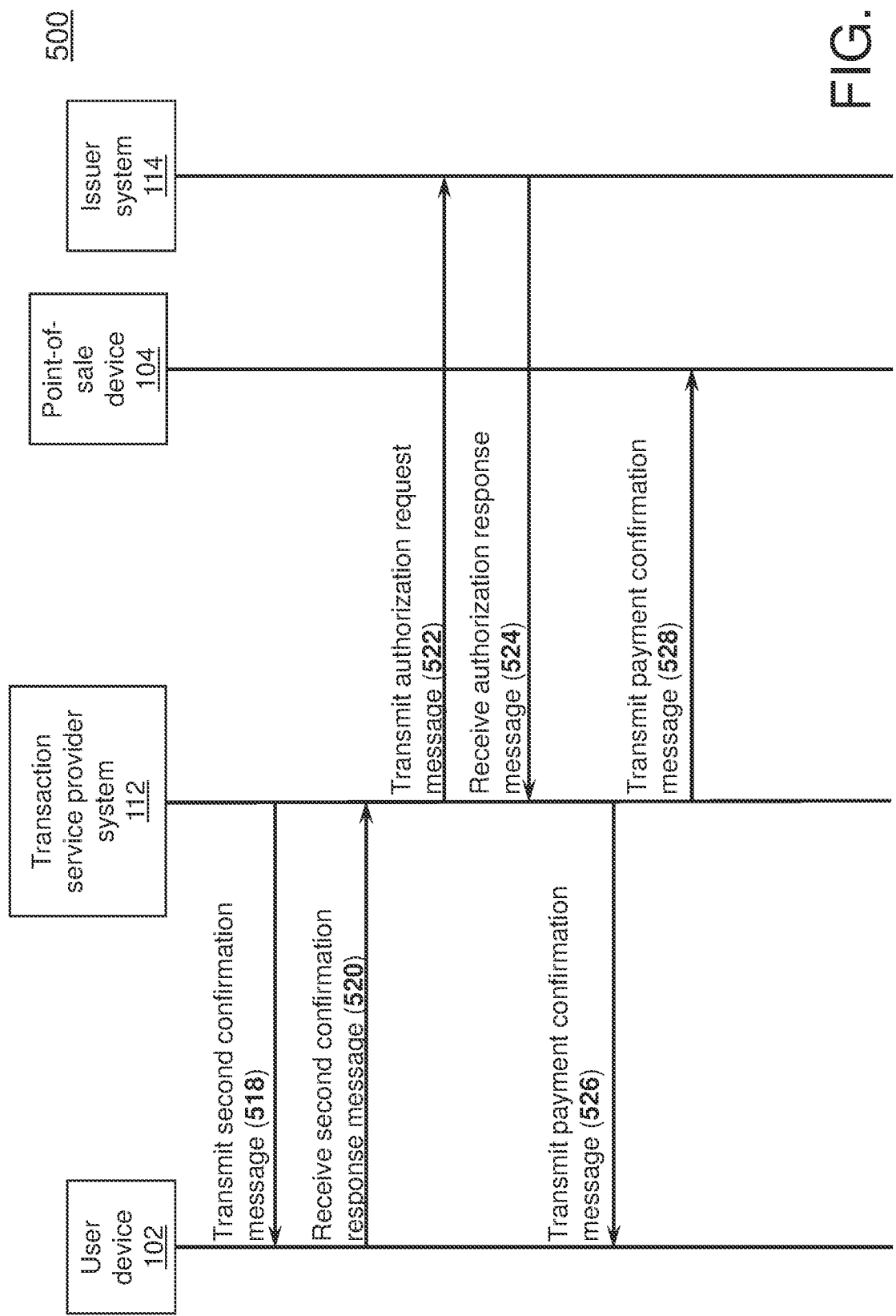

Referring now to FIGS. 5A and 5B, illustrated is an implementation 500 of non-limiting aspects or embodiments of a process for communicating transaction data between mobile devices. As illustrated in FIGS. 5A and 5B, implementation 500 includes user device 102, POS device 104, transaction service provider system 112, and issuer system 114.

As shown by reference number 502 in FIG. 5A, user device 102 may register with transaction service provider system 112. During registration, user device 102 may transmit account data associated with an account of a user as well as device data associated with user device 102 to transaction service provider system 112. In response, transaction service provider system 112 may store the account data associated with the account of the user and the device data associated with user device 102 in association with one another (e.g., in a database of transaction service provider system 112). User device 102 may additionally, or alternatively, transmit confirmation data associated with confirmation of a transaction corresponding to user device 102, the confirmation data including a unique confirmation code. In some non-limiting aspects or embodiments, user device 102 may be used to make a telephone call to register with transaction service provider system 112. In some non-limiting aspects or embodiments, in response to receiving account data associated with the account of the user and device data associated with user device 102, transaction service provider system 112 may generate an account token and transmit the account token (e.g., as data or over a telephone call), the account token linked to the account of the user and the device data associated with user device 102. In some non-limiting aspects or embodiments, transaction service provider system 112 may transmit confirmation data associated with confirmation of a transaction to user device 102.

As shown by reference number 504 in FIG. 5A, POS device 104 may register with transaction service provider system 112. During registration, POS device 104 may transmit account data associated with an account of a merchant as well as device data associated with POS device 104 to transaction service provider system 112. In response, transaction service provider system 112 may store the account data associated with the account of the merchant and the device data associated with POS device 104 in association with one another (e.g., in a database of transaction service provider system 112). POS device 104 may additionally, or alternatively, transmit confirmation data associated with confirmation of a transaction corresponding to POS device 104, the confirmation data including a unique confirmation code. In some non-limiting aspects or embodiments, POS device 104 may be used to make a telephone call to register with transaction service provider system 112. In some non-limiting aspects or embodiments, in response to receiving account data associated with the account of the merchant and device data associated with POS device 104, transaction service provider system 112 may generate an account token and transmit the account token (e.g., as data or over a telephone call), and the account token may be linked to the account of the merchant and the device data associated with POS device 104. In some non-limiting aspects or embodiments, transaction service provider system 112 may transmit confirmation data associated with confirmation of a transaction to POS device 104.

As shown by reference number 506 in FIG. 5A, user device 102 may transmit transaction data associated with a transaction to transaction service provider system 112. For example, user device 102 may transmit transaction data including device data associated with POS device 104, device data associated with user device 102, and transaction parameters associated with the transaction to transaction service provider system 112 to initiate a transaction. Transaction service provider system 112 may generate a pre-authorization request associated with the transaction based on receiving the transaction data from user device 102.

As shown by reference number 508 in FIG. 5A, transaction service provider system 112 may transmit a first confirmation message to user device 102 to confirm the transaction (e.g., a push payment that includes the withdrawal of funds from a user account corresponding to user device 102 for transfer to a merchant account corresponding to POS device 104). User device 102 may generate a first confirmation response message based on the first confirmation message, the first confirmation response message including data associated with an indication as to whether the transaction is approved or not approved. For example, in some non-limiting aspects or embodiments, user device 102 may generate a display based on the first confirmation message to cause a user to input an indication that the transaction is approved or not approved. User device 102 may receive input and, based on the input, generate a first confirmation response message including data indicating that the transaction is approved or not approved.

As shown by reference number 510 in FIG. 5A, transaction service provider system 112 receives a first confirmation response message. For example, user device 102 may transmit the first confirmation response based on receiving input indicating acceptance or non-acceptance of a transaction by a user at user device 102.

As shown by reference number 512 in FIG. 5A, transaction service provider system 112 may transmit the pre-authorization request message to issuer system 114. For example, to determine whether a transaction can be processed (e.g., whether sufficient funds are or are not available in an account drawn from to satisfy a transaction) transaction service provider system 112 may transmit a pre-authorization request message to cause issuer system 114 to generate a pre-authorization response message indicating that sufficient funds are or are not available from the account associated with user device 102 to satisfy the transaction.

As shown by reference number 514 in FIG. 5A, transaction service provider system 112 receives a pre-authorization response message including data indicating that the transaction is approved or not approved. Where the pre-authorization response message indicates that insufficient funds are available to satisfy the transaction, the transaction may be terminated. In some non-limiting aspects or embodiments, where the pre-authorization response message indicates that insufficient funds are available to satisfy the transaction, transaction service provider system 112 may send a message to user device 102, the message including data indicating that insufficient funds are available to satisfy the transaction.

As shown by reference number 516 in FIG. 5A, transaction service provider system 112 may determine that the transaction is a high-value transaction. For example, transaction service provider system 112 may determine the transaction is a high-value transaction based on transaction parameters of the transaction data. Additionally, or alternatively, where the transaction is determined to be a low-value transaction, implementation 500 may continue to reference number 522 and transmit an authorization request message to an issuer system 114.

As shown by reference number 518 in FIG. 5B, transaction service provider system 112 may transmit a second confirmation message to user device 102. Transaction service provider system 112 may transmit the second confirmation message to user device 102 to cause user device 102 to generate a second confirmation response message including confirmation data associated with confirmation of the transaction. User device 102 may generate confirmation data associated with confirmation of the transaction based on input received at user device 102 (e.g., the input of a unique confirmation code).

As shown by reference number 520 in FIG. 5B, transaction service provider system 112 may receive a second confirmation response message from user device 102. For example, transaction service provider system 112 may receive a second confirmation response message including confirmation data associated with confirmation of the transaction from user device 102. Transaction service provider system 112 may determine that the confirmation data matches confirmation data corresponding to the user device 102 received during registration of user device 102 with the transaction service provider system. The transaction service provider system 112 may generate an authorization request message associated with the transaction based on the transaction data associated with the transaction and the determination that the second confirmation response message includes confirmation data that matches the confirmation data corresponding to the user device 102 received during registration of user device 102.

As shown by reference number 522 in FIG. 5B, transaction service provider system 112 may transmit an authorization request message to issuer system 114, the authorization request message based on transaction data associated with the transaction. In some non-limiting aspects or embodiments, issuer system 114 may generate an authorization response message based on the authorization request.

As shown by reference number 524 in FIG. 5B, transaction service provider system 112 may receive an authorization response message from issuer system 114. For example, transaction service provider system 112 may receive the authorization response message from issuer system 114, the authorization response indicating that the transaction is accepted or not accepted. In some non-limiting aspects or embodiments, where the transaction is determined to be a low-value transaction, an authorization request message may be generated based on the determination the transaction is a low-value transaction, without the transmission of a second confirmation message and reception of a second confirmation response message by the transaction service provider system 112.

As shown by reference number 526 in FIG. 5B, a payment confirmation message may be transmitted to user device 102. For example, transaction service provider system 112 may transmit the payment confirmation to user device 102, the payment confirmation message including data associated with an indication as to whether the transaction was approved or not approved. User device 102 may display an indication that the transaction was processed and approved or not approved based on receiving the payment confirmation message.

As shown by reference number 528 in FIG. 5B, transaction service provider system 112 may transmit a payment confirmation message to POS device 104. For example, transaction service provider system 112 may transmit the payment confirmation to POS device 104, the payment confirmation message including data associated with an indication as to whether the transaction was approved or not approved. POS device 104 may display an indication that the transaction was processed and approved or not approved based on receiving the payment confirmation message.

Figure 6B:
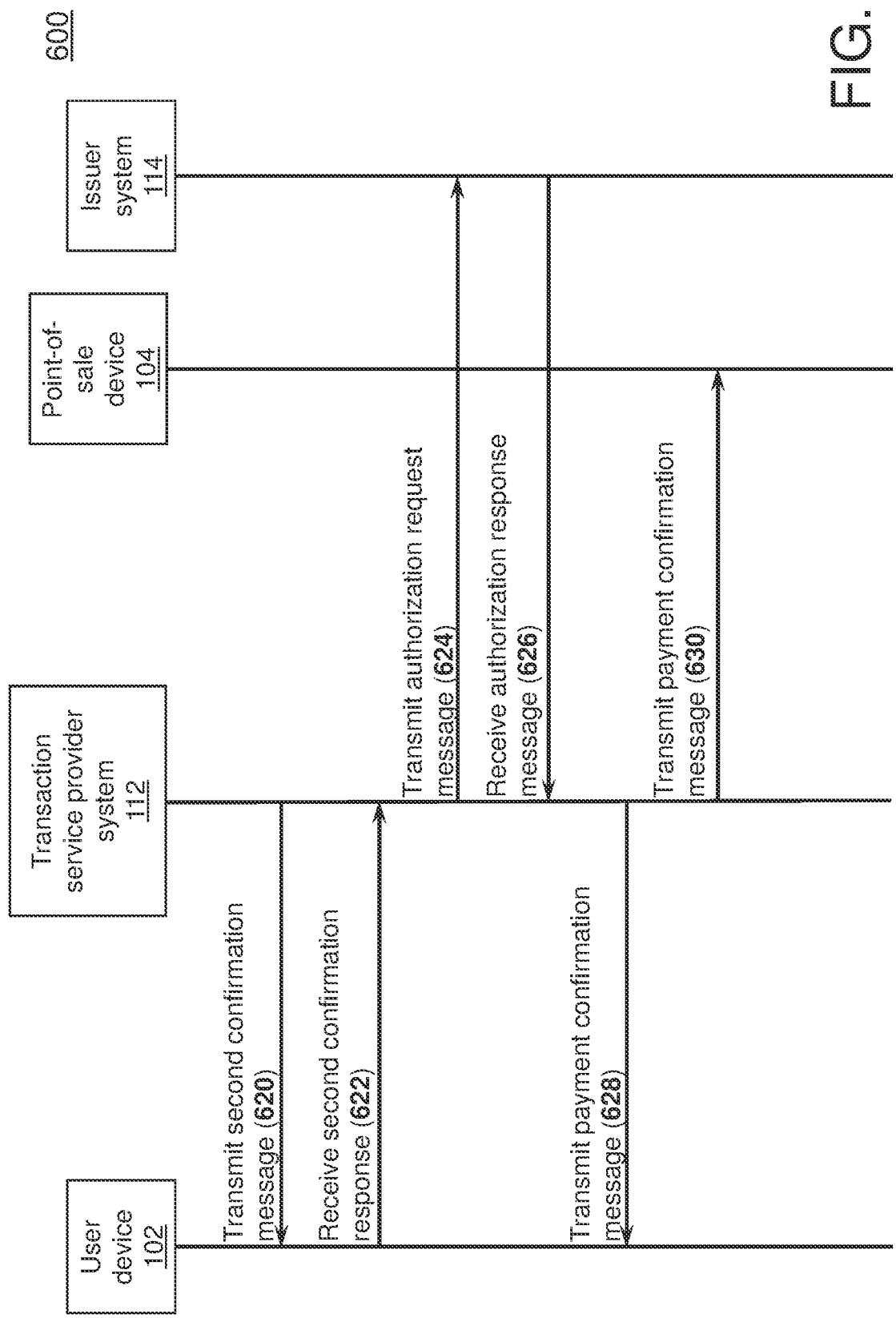

Referring now to FIGS. 6A and 6B, illustrated is an implementation 600 of non-limiting aspects or embodiments of a process for communicating transaction data between mobile devices. As illustrated in FIGS. 6A and 6B, implementation 600 includes user device 102, POS device 104, transaction service provider system 112, and issuer system 114.

As shown by reference number 602 in FIG. 6A, user device 102 may register with transaction service provider system 112. During registration, user device 102 may transmit account data associated with an account of a user as well as device data associated with user device 102 to transaction service provider system 112. In response, transaction service provider system 112 may store the account data associated with the account of the user and the device data associated with user device 102 in association with one another (e.g., in a database of transaction service provider system 112). User device 102 may additionally, or alternatively, transmit confirmation data associated with confirmation of a transaction corresponding to user device 102, the confirmation data including a unique confirmation code. In some non-limiting aspects or embodiments, user device 102 may be used to make a telephone call to register with transaction service provider system 112. In some non-limiting aspects or embodiments, in response to receiving account data associated with the account of the user and device data associated with user device 102, transaction service provider system 112 may generate an account token and transmit the account token (e.g., as data or over a telephone call), and the account token may be linked to the account of the user and the device data associated with user device 102. In some non-limiting aspects or embodiments, transaction service provider system 112 may transmit confirmation data associated with confirmation of a transaction to user device 102.

As shown by reference number 604 in FIG. 6A, POS device 104 may register with transaction service provider system 112. During registration, POS device 104 may transmit account data associated with an account of a merchant as well as device data associated with POS device 104 to transaction service provider system 112. In response, transaction service provider system 112 may store the account data associated with the account of the merchant and the device data associated with POS device 104 in association with one another (e.g., in a database of transaction service provider system 112). POS device 104 may additionally, or alternatively, transmit confirmation data associated with confirmation of a transaction corresponding to POS device 104, the confirmation data including a unique confirmation code. In some non-limiting aspects or embodiments, POS device 104 may be used to initiate a telephone call to register with transaction service provider system 112. In some non-limiting aspects or embodiments, in response to receiving account data associated with the account of the merchant and device data associated with POS device 104, transaction service provider system 112 may generate an account token and transmit the account token (e.g., as data or over a telephone call), the account token linked to the account of the merchant and the device data associated with POS device 104. In some non-limiting aspects or embodiments, transaction service provider system 112 may transmit confirmation data associated with confirmation of a transaction to POS device 104.

As shown by reference number 606 in FIG. 6A, user device 102 may transmit transaction data associated with a transaction to POS device 104 either via a short-range wireless communication connection, an SMS communication connection, and/or a data connection. Transaction data may include device data associated with user device 102 and/or transaction parameters associated with the transaction. In some non-limiting aspects or embodiments, user device 102 and/or POS device 104 may determine that user device 102 and/or POS device 104 are not configured to exchange transaction data and, upon such a determination, may generate a display indicating that the devices are not configured to exchange transaction data (e.g., that the devices have installed therein incompatible electronic wallet applications and/or the like).

As shown by reference number 608 in FIG. 6A, POS device 104 may transmit the transaction data to transaction service provider system 112. For example, POS device 104 may transmit transaction data including device data associated with user device 102, device data associated with POS device 104, and/or transaction parameters associated with the transaction. Transaction service provider system 112 may generate a first confirmation message based on receiving the transaction data.

As shown by reference number 610 in FIG. 6A, transaction service provider system 112 may transmit a first confirmation message to user device 102. User device 102 may generate a display based on the first confirmation message and, based on the display, may receive input indicating that the transaction is confirmed or not confirmed. User device 102 may generate a first confirmation response message indicating whether the transaction is confirmed or not confirmed based on receiving the input.

As shown by reference number 612 in FIG. 6A, user device 102 may transmit a first confirmation response message to transaction service provider system 112. Transaction service provider system 112 may determine whether the transaction is confirmed or not confirmed based on the first confirmation response message. Transaction service provider system 112 may generate a pre-authorization request message based on the first confirmation response message and/or the transaction data.

As shown by reference number 614 in FIG. 6A, transaction service provider system 112 may transmit a pre-authorization request message to issuer system 114. Issuer system 114 may generate a pre-authorization response message based on the pre-authorization request message.

As shown by reference number 616 in FIG. 6A, transaction service provider system 112 may receive a pre-authorization response message from issuer system 114.

As shown by reference number 618 in FIG. 6A, transaction service provider system 112 may determine whether the transaction is a high-value transaction. For example, where the transaction is determined to be a high-value transaction, transaction service provider system 112 may generate and transmit a second confirmation message. Additionally, or alternatively, where the transaction is determined to be a low-value transaction, the transaction service provider system 112 may process the transaction (see reference numbers 624-630 of FIG. 6B).

As shown by reference number 620 in FIG. 6B, transaction service provider system 112 may transmit a second confirmation message to user device 102. User device 102 may generate a display and receive an input based on generating the display, the input including confirmation data associated with confirmation of the transaction.

As shown by reference number 622 in FIG. 6B, transaction service provider system 112 may receive a second confirmation response from user device 102. Transaction service provider system 112 may determine whether the transaction is valid or not valid based on the second confirmation response message and, in response to determining that it is valid, may generate an authorization request message.

As shown by reference number 624 in FIG. 6B, transaction service provider system 112 may transmit an authorization request message to issuer system 114. Issuer system 114 may determine whether the transaction is authorized and, based on the determination, may generate an authorization response message.

As shown by reference number 626 in FIG. 6B, transaction service provider system 112 may receive an authorization response message from issuer system 114.

As shown by reference number 628 in FIG. 6B, transaction service provider system 112 may transmit a payment confirmation message to user device 102, the payment confirmation message including data associated with an indication as to whether the transaction was approved or not approved.

As shown by reference number 630 in FIG. 6B, transaction service provider system 112 may transmit a payment confirmation message to POS device 104, the payment confirmation message including data associated with an indication as to whether the transaction was approved or not approved.

Although examples have been described in detail for the purpose of illustration based on what is currently considered to be the most practical and preferred aspects or embodiments, it is to be understood that such detail is solely for that purpose and that the principles described by the present disclosure are not limited to the disclosed aspects or embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for communicating transaction data between a merchant point-of-sale (POS) device and a user device, the POS device and the user device registered to an application hosted by a transaction service provider system, the method comprising:

receiving, with at least one processor of the transaction service provider system via a data connection between the POS device and the transaction service provider system, transaction data comprising device data associated with the POS device, device data associated with the user device, and a transaction value;

determining, with the at least one processor of the transaction service provider system, whether a transaction is a valid transaction;

transmitting, with the at least one processor of the transaction service provider system via the data connection between the POS device and the transaction service provider system, a transaction parameter confirmation message based on receiving the transaction data;

transmitting, with the at least one processor of the transaction service provider system via a data connection between an issuer server and the transaction service provider system, a pre-authorization request message to the issuer server in response to receiving a transaction parameter confirmation response message from the POS device;

transmitting, with the at least one processor of the transaction service provider system via a data connection between the user device and the transaction service provider system, a first confirmation message associated with the transaction to confirm the transaction based on receiving a pre-authorization response message from the issuer server, the pre-authorization response message comprising an indication that an account balance of a user account associated with the user device is greater than the transaction value;

receiving, with the at least one processor of the transaction service provider system via the data connection between the user device and the transaction service provider system, a first confirmation response message; and processing, with the at least one processor of the transaction service provider system, the transaction data based on receiving the first confirmation response message.

2. The computer-implemented method according to claim 1, further comprising:

receiving, with the at least one processor of the transaction service provider system via the data connection between the POS device and the transaction service provider system, account data associated with a merchant account and the device data associated with the POS device; and registering, with the at least one processor of the transaction service provider system, the account data associated with the merchant account as corresponding to the device data associated with the POS device to the application hosted by the transaction service provider system.

3. The computer-implemented method according to claim 2, further comprising:

storing, with the at least one processor of the transaction service provider system, account data associated with the merchant account in association with the device data associated with the POS device.

4. The computer-implemented method according to claim 1, further comprising:

receiving, with the at least one processor of the transaction service provider system via the data connection between the user device and the transaction service provider system, account data associated with the user account and the device data associated with the user device; and registering, with the at least one processor of the transaction service provider system, the account data associated with the user account as corresponding to the device data associated with the user device to the application hosted by the transaction service provider system.

5. The computer-implemented method according to claim 4, further comprising:

storing, with the at least one processor of the transaction service provider system, the account data associated with the user account in association with the device data associated with the user device.

6. The computer-implemented method according to claim 1, wherein determining whether the transaction is a valid transaction comprises:

determining the device data associated with the POS device matches confirmation data received by the POS device during registration of the POS device; and determining the device data associated with the user device matches confirmation data received by the user device during registration of the user device.

7. The computer-implemented method according to claim 6, wherein determining whether the transaction is a valid transaction further comprises:

determining the device data associated with the POS device matches confirmation data received by the POS device during registration of the POS device to the application; and determining the device data associated with the user device matches confirmation data received by the user device during registration of the user device to the application.

8. The computer-implemented method according to claim 1, further comprising:

determining, with the at least one processor of the transaction service provider system, that a transaction authorization limit is greater than an authorization limit threshold;

transmitting, with the at least one processor of the transaction service provider system via the data connection between the user device and the transaction service provider system, a second confirmation message associated with the transaction based on determining that a transaction authorization limit is greater than an authorization limit threshold; and confirming, with the at least one processor of the transaction service provider system, prior to processing the transaction data, that a second confirmation response is valid based on receiving a second confirmation response message associated with the transaction.

9. The computer-implemented method according to claim 8, wherein transmitting the first confirmation message associated with the transaction comprises:

transmitting, with the at least one processor of the transaction service provider system via the data connection between the user device and the transaction service provider system, the first confirmation message associated with the transaction in response to determining that the account balance of the user account is greater than the transaction authorization limit based on the indication.

10. A system for communicating transaction data between a merchant point-of-sale (POS) device and a user device, the POS device and the user device registered to an application hosted by a transaction service provider system, the system comprising:

at least one processor of the transaction service provider system, the at least one processor programmed or configured to:

receive, via a data connection between the POS device and the transaction service provider system, transaction data comprising device data associated with the POS device, device data associated with the user device, and a transaction value;

determine whether a transaction is a valid transaction;

transmit, via the data connection between the POS device and the transaction service provider system, a transaction parameter confirmation message based on receiving the transaction data;

transmit, via a data connection between an issuer server and the transaction service provider system, a pre-authorization request message to the issuer server in response to receiving a transaction parameter confirmation response message from the POS device;

transit, via a data connection between the user device and the transaction service provider system, a first confirmation message associated with the transaction to confirm the transaction based on receiving a pre-authorization response message from the issuer server, the pre-authorization response message comprising an indication that an account balance of a user account associated with the user device is greater than the transaction value;

receive, via the data connection between the user device and the transaction service provider system, a first confirmation response message; and process the transaction data based on receiving the first confirmation response message.

11. The system according to claim 10, wherein the at least one processor of the transaction service provider system is further programmed or configured to:

receive, via the data connection between the POS device and the transaction service provider system, account data associated with a merchant account and the device data associated with the POS device; and register the account data associated with the merchant account as corresponding to the device data associated with the POS device to the application hosted by the transaction service provider system.

12. The system according to claim 11, wherein the at least one processor of the transaction service provider system is further programmed or configured to:

store the account data associated with the merchant account in association with the device data associated with the POS device.

13. The system according to claim 10, wherein the at least one processor of the transaction service provider system is further programmed or configured to:

receive, via the data connection between the user device and the transaction service provider system, account data associated with the user account and the device data associated with the user device; and register the account data associated with the user account as corresponding to the device data associated with the user device to the application hosted by the transaction service provider system.

14. The system according to claim 13, wherein the at least one processor of the transaction service provider system is further programmed or configured to:

store the account data associated with the user account in association with the device data associated with the user device.

15. The system according to claim 10, wherein when determining whether the transaction is a valid transaction, the at least one processor of the transaction service provider system is programmed or configured to:

determine the device data associated with the POS device matches confirmation data received by the POS device during registration of the POS device; and determine the device data associated with the user device matches confirmation data received by the user device during registration of the user device.

16. The system according to claim 15, wherein when determining whether the transaction is a valid transaction, the at least one processor of the transaction service provider system is programmed or configured to:

determine the device data associated with the POS device matches confirmation data received by the POS device during registration of the POS device to the application; and determine the device data associated with the user device matches confirmation data received by the user device during registration of the user device to the application.

17. The system according to claim 10, wherein the at least one processor of the transaction service provider system is further programmed or configured to:

determine that a transaction authorization limit is greater than an authorization limit threshold;

transmit, via the data connection between the user device and the transaction service provider system, a second confirmation message associated with the transaction based on determining that a transaction authorization limit is greater than an authorization limit threshold; and confirm, prior to processing the transaction data, that a second confirmation response is valid based on receiving a second confirmation response message associated with the transaction.

18. The system according to claim 17, wherein, when transmitting the first confirmation message associated with the transaction, the at least one processor of the transaction service provider system is programmed or configured to:

transmit, via the data connection between the user device and the transaction service provider system, the first confirmation message associated with the transaction in response to determining that the account balance of the user account is greater than the transaction authorization limit based on the indication.

19. A computer program product for communicating transaction data between a merchant point-of-sale (POS) device and a user device, the POS device and the user device registered to an application hosted by a transaction service provider system, the computer program product comprising a non-transitory computer readable medium comprising at least one processor of the transaction service provider system, the at least one processor programmed or configured to:

receive, via a data connection between the POS device and the transaction service provider system, transaction data comprising device data associated with the POS device, device data associated with the user device, and a transaction value;

determine whether the transaction is a valid transaction;

transmit, via the data connection between the POS device and the transaction service provider system, a transaction parameter confirmation message based on receiving the transaction data;

transmit, via a data connection between an issuer server and the transaction service provider system, a pre-authorization request message to the issuer server in response to receiving a transaction parameter confirmation response message from the POS device;

transit, via a data connection between the user device and the transaction service provider system, a first confirmation message associated with the transaction to confirm the transaction based on receiving a pre-authorization response message from the issuer server, the pre-authorization response message comprising an indication that an account balance of a user account associated with the user device is greater than the transaction value;

receive, via the data connection between the user device and the transaction service provider system, a first confirmation response message; and process the transaction data based on receiving the first confirmation response message.

20. The computer program product according to claim 19, wherein the at least one processor is further programmed or configured to:
receive, via the data connection between the POS device and the transaction service provider system, account data associated with a merchant account and the device data associated with the POS device; and
register the account data associated with the merchant account as corresponding to the device data associated with the POS device to the application hosted by the transaction service provider system.

* * * * *